United States Patent
Yu et al.

(10) Patent No.: US 12,423,820 B2
(45) Date of Patent: Sep. 23, 2025

(54) IMAGE SEGMENTATION METHOD AND APPARATUS, COMPUTER DEVICE, AND STORAGE MEDIUM

(71) Applicant: TENCENT TECHNOLOGY (SHENZHEN) COMPANY LIMITED, Shenzhen (CN)

(72) Inventors: Shuang Yu, Shenzhen (CN); Wei Ji, Shenzhen (CN); Kai Ma, Shenzhen (CN); Yefeng Zheng, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 464 days.

(21) Appl. No.: 18/074,906

(22) Filed: Dec. 5, 2022

(65) Prior Publication Data

US 2023/0106468 A1 Apr. 6, 2023

Related U.S. Application Data

(63) Continuation of application No. PCT/CN2022/077951, filed on Feb. 25, 2022.

(30) Foreign Application Priority Data

Mar. 3, 2021 (CN) .......................... 202110234267.7

(51) Int. Cl.
*G06T 7/00* (2017.01)
*G06T 7/10* (2017.01)

(52) U.S. Cl.
CPC ...... *G06T 7/10* (2017.01); *G06T 2207/20084* (2013.01); *G06T 2207/20221* (2013.01); *G06T 2207/20224* (2013.01)

(58) Field of Classification Search
CPC ............ G06T 7/10; G06T 2207/20084; G06T 2207/20221; G06T 2207/20224;
(Continued)

(56) References Cited

U.S. PATENT DOCUMENTS

| 2014/0050391 A1* | 2/2014 | Angelova ............... G06V 20/00 382/173 |
| 2019/0220977 A1* | 7/2019 | Zhou ...................... G06N 3/084 |

(Continued)

FOREIGN PATENT DOCUMENTS

| CN | 109598727 A | 4/2019 |
| CN | 111563910 A | 8/2020 |

(Continued)

OTHER PUBLICATIONS

The World Intellectual Property Organization (WIPO) International Search Report for PCT/CN2022/077951 May 7, 2022 7 Pages (including translation).

(Continued)

*Primary Examiner* — Van D Huynh
(74) *Attorney, Agent, or Firm* — ANOVAL AW GROUP PLLC

(57) ABSTRACT

An image segmentation method includes: encoding an original image containing a target object based on a prior knowledge vector, to obtain a target feature map, the prior knowledge vector comprising a plurality of prior knowledge weights each representing accuracy of a corresponding rater labeling a region of an object in an image; decoding the target feature map, to obtain a first segmented image of the original image, the first segmented image indicating a target region in which the target object is located in the original image; performing image reconstruction on the first segmented image based on the prior knowledge vector, to obtain labeled segmented images, wherein one labeled segmented (Continued)

image corresponds to one prior knowledge weight and indicates a target region labeled by a corresponding rater; and processing the target feature map based on the labeled segmented images, to obtain a second segmented image of the original image.

20 Claims, 13 Drawing Sheets

(58) Field of Classification Search
CPC . G06T 2207/20081; G06T 2207/30041; G06T 7/0012; G06T 7/11; G06T 3/4038; G06T 5/50; G06T 9/00; G06T 2200/32; G06T 5/70

See application file for complete search history.

(56) References Cited

U.S. PATENT DOCUMENTS

| | | | |
|---|---|---|---|
| 2020/0258235 A1* | 8/2020 | Lu | G06N 20/20 |
| 2021/0303928 A1* | 9/2021 | Xu | G06F 18/41 |
| 2021/0350168 A1* | 11/2021 | Tian | G06T 3/40 |
| 2021/0383549 A1* | 12/2021 | Wang | G06T 7/11 |
| 2022/0028129 A1* | 1/2022 | Balashova | G06N 20/00 |
| 2022/0036124 A1* | 2/2022 | Gao | G06T 7/136 |
| 2022/0036135 A1* | 2/2022 | Hu | G06V 20/70 |
| 2022/0166976 A1* | 5/2022 | Choo | H04N 19/12 |
| 2022/0230310 A1* | 7/2022 | Xie | G06T 7/0012 |
| 2024/0005484 A1* | 1/2024 | Buerger | G06T 7/0012 |

FOREIGN PATENT DOCUMENTS

| | | |
|---|---|---|
| CN | 111583282 A | 8/2020 |
| CN | 112365512 A | 2/2021 |
| CN | 112598686 A | 4/2021 |

OTHER PUBLICATIONS

Wei Ji et al., "Learning Calibrated Medical Image Segmentation via Multi-rater Agreement Modeling", Nov. 13, 2021, 2021 IEEE/CVF Conference on Computer Vision and Pattern Recognition (CVPR).
Shihao Zhang, Huazhu Fu, Yuguang Yan, Yubing Zhang, Qingyao Wu, Ming Yang, Mingkui Tan, and Yanwu Xu. Attention guided network for retinal image segmentation. In International Conference on Medical Image Computing and Computer Assisted Intervention, pp. 797-805, 2019. 2, 7.
He Zhao, Huiqi Li, and Li Cheng. Improving retinal vessel segmentation with joint local loss by matting. Pattern Recognition, 98:107068, 2020. 1, 2.
He Zhao, Huiqi Li, Sebastian Maurer-Stroh, Yuhong Guo, Qiuju Deng, and Li Cheng. Supervised segmentation of unannotated retinal fundus images by synthesis. IEEE Transactions on Medical Imaging, 38(1):46-56, 2018. 2.
Ahmed Almazroa, Sami Alodhayb, Essameldin Osman, Eslam Ramadan, Mohammed Hummadi, Mohammed Dlaim, Muhannad Alkatee, Kaamran Raahemifar, and Vasudevan Lakshminarayanan. Agreement among ophthalmologists in marking the optic disc and optic cup in fundus images. International Ophthalmology, 37(3):701-717, 2017. 3, 6, 7.
Christian F Baumgartner, Kerem C Tezcan, Krishna Chaitanya, Andreas M H¨otker, Urs J Muehlematter, Khoschy Schawkat, Anton S Becker, Olivio Donati, and Ender Konukoglu. PHiSeg: Capturing uncertainty in medical image segmentation. In International Conference on Medical Image Computing and Computer Assisted Intervention,pp. 119-127. Springer, 2019. 2.
Anton S Becker, Krishna Chaitanya, Khoschy Schawkat,Urs J Muehlematter, Andreas M H¨otker, Ender Konukoglu, and Olivio F Donati. Variability of manual segmentation of the prostate in axial T2-weighted Mri: A multi-reader study. European Journal of Radiology, 121:108716, 2019. 1.
Cheng Chen, Qi Dou, Yueming Jin, Hao Chen, Jing Qin, and Pheng-Ann Heng. Robust multimodal brain tumor segmentation via feature disentanglement and gated fusion. In International Conference on Medical Image Computing and Computer Assisted Intervention, pp. 447-456. Springer,2019.2.
Geng Chen, Dehui Xiang, Bin Zhang, Haihong Tian, Xiaoling Yang, Fei ShiWeifang Zhu, Bei Tian, and Xinjian Chen. Automatic pathological lung segmentation in low-dose CT image using eigenspace sparse shape composition. IEEE Transactions on Medical Imaging, 38(7):1736-1749, 2019.1,2.
Shengcong Chen, Changxing Ding, and Minfeng Liu. Dualforce convolutional neural networks for accurate brain tumor segmentation. Pattern Recognition, 88:90-100, 2019. 2.
Jun Cheng, Jiang Liu, Yanwu Xu, Fengshou Yin, Damon Wing Kee Wong, Ngan-Meng Tan, Dacheng Tao, Ching-Yu Cheng, Tin Aung, and Tien Yin Wong. Superpixel classification based optic disc and optic cup segmentation for glaucoma screening. IEEE Transactions on Medical Imaging,32(6):1019-1032, 2013. 2.
Li Cheng and Terry Caelli. Unsupervised image segmentation:A Bayesian approach. In Proceedings of 16th International Conference on Vision Interface, Halifax, Canada,pp. 251-257, 2003. 2.
Li Cheng, Ning Ye, Weimiao Yu, and Andre Cheah. Discriminative segmentation of microscopic cellular images. In International Conference on Medical Image Computing and Computer Assisted Intervention, pp. 637-644 Springer,2011.2.
Jason J Corso, Eitan Sharon, Shishir Dube, Suzie El-Saden,Usha Sinha, and Alan Yuille. Efficient multilevel brain tumor segmentation with integrated Bayesian model classification.IEEE Transactions on Medical Imaging, 27 (5):629-640, 2008. 1.
Huazhu Fu, Jun Cheng, Yanwu Xu, DamonWing KeeWong,Jiang Liu, and Xiaochun Cao. Joint optic disc and cup segmentation based on multi-label deep network and polar transformation. IEEE Transactions on Medical Imaging,37 (7):1597-1605, 2018. 2.
Huazhu Fu, Fei Li, Yanwu Xu, Jingan Liao, Jian Xiong, Jianbing Shen, Jiang Liu, and Xiulan Zhang. A retrospective comparison of deep learning to manual annotations for optic disc and optic cup segmentation in fundus photos. medRxiv,2020.1.
Yarin Gal and Zoubin Ghahramani. Dropout as a Bayesian approximation: Representing model uncertainty in deep learning. In International Conference on Machine Learning,pp. 1050-1059, 2016. 8.
Zaiwang Gu, Jun Cheng, Huazhu Fu, Kang Zhou, Huaying Hao, Yitian Zhao, Tianyang Zhang, Shenghua Gao, and Jiang Liu. CE-Net: Context encoder network for 2D medical image segmentation. IEEE Transactions on Medical Imag-ing,38(10):2281-2292, 2019. 2, 7.
Melody Guan, Varun Gulshan, Andrew Dai, and Geoff Hinton.Who said what: Modeling individual labelers improves classification. In AAAI Conference on Artificial Intelligence,pp. 3109-3118, 2018. 2, 6, 7, 8.
Mohammad Havaei, Axel Davy, David Warde-Farley, Antoine Biard, Aaron Courville, Yoshua Bengio, Chris Pal,Pierre-Marc Jodoin, and Hugo Larochelle. Brain tumor segmentation with deep neural networks. Medical Image Analysis, 35:18-31, 2017. 1.
Kaiming He, Xiangyu Zhang, Shaoqing Ren, and Jian Sun. Identity mappings in deep residual networks. In European Conference on Computer Vision, pp. 630-645, 2016. 3.
Martin Holm Jensen, Dan Richter Jørgensen, Raluca Jalaboi, Mads Eiler Hansen, and Martin Aastrup Olsen. Improving uncertainty estimation in convolutional neural networks using inter-rater agreement. In International Conference on Medical Image Computing and Computer Assisted Intervention, pp. 540-548, 2019. 2, 6, 7, 8.
Haozhe Jia, Yong Xia, Yang Song, Donghao Zhang, Heng Huang, Yanning Zhang, and Weidong Cai. 3D APA-Net: 3D adversarial pyramid anisotropic convolutional network for prostate segmentation in MR images. IEEE Transactions on Medical Imaging, 39(2):447-457, 2019. 2.
Justin Johnson, Alexandre Alahi, and Li Fei-Fei. Perceptual losses for real-time style transfer and super-resolution. In European Conference on Computer Vision, pp. 694-711.Springer, 2016. 5.
Leo Joskowicz, D Cohen, N Caplan, and J Sosna. Interobserver variability of manual contour delineation of structures in CT. European Radiology, 29(3):1391-1399, 2019.1.

(56) References Cited

OTHER PUBLICATIONS

Alain Jungo, Raphael Meier, Ekin Ermis, Marcela Blatti-Moreno, Evelyn Herrmann, Roland Wiest, and Mauricio Reyes. On the effect of inter-observer variability for a reliable estimation of uncertainty of medical image segmentation. In International Conference on Medical Image Computing and Computer Assisted Intervention, pp. 682-690 Springer, 2018. 2.
Diederik P Kingma and Jimmy Lei Ba. Adam: A method for stochastic optimization. In International Conference on Learning Representations, 2015. 6.
Simon Kohl, Bernardino Romera-Paredes, Clemens Meyer,Jeffrey de Fauw, Joseph R Ledsam, Klaus Maier-Hein, SM Ali Eslami, Danilo Jimenez Rezende, and Olaf Ronneberger. A probabilistic U-Net for segmentation of ambiguous images. In Advances in Neural Information Processing Systems, pp. 6965-6975, 2018. 2.
Alex Krizhevsky, Ilya Sutskever, and Geoffrey E Hinton. ImageNet classification with deep convolutional neural networks. In Advances in Neural Information Processing Systems, pp. 1097-1105, 2012. 6.
Sajeesh Kumar, Antonio Giubilato, William Morgan, Ludmila Jitskaia, Chris Barry, Max Bulsara, Ian J Constable, and Kanagasingam Yogesan. Glaucoma screening: analysis of conventional and telemedicine-friendly devices. Clinical & Experimental Ophthalmology, 35(3):237-243, 2007. 1.
Ge Li, Changsheng Li, Chan Zeng, Peng Gao, and Guotong Xie. Region focus network for joint optic disc and cup segmentation. The Thirty-Fourth AAAI Conference on Artificial Intelligence, 34(1):751-758, 2020. 1, 2.
Quande Liu, Qi Dou, Lequan Yu, and Pheng Ann Heng. MSNet: Multi-site network for improving prostate segmentation with heterogeneous MRI data. IEEE Transactions on Medical Imaging, 2020. 1, 2.
Jonathan Long, Evan Shelhamer, and Trevor Darrell. Fully convolutional networks for semantic segmentation. In Proceedings of the IEEE Conference on Computer Vision and Pattern Recognition, pp. 3431-3440, 2015. 8.
Bjoern Menze, Leo Joskowicz, Spyridon Bakas, Andras Jakab, Ender Konukoglu, Anton Becker, and et al. https://qubiq.grand-challenge.org. In Quantification of Uncertainties in Biomedical Image Quantification Challenge at MICCAI, 2020. 6.
Agata Mosinska, Pablo Marquez-Neila, Mateusz Kozi'nski, and Pascal Fua. Beyond the pixel-wise loss for topologyaware delineation. In Proceedings of the IEEE Conference on Computer Vision and Pattern Recognition, pp. 3136-3145, 2018. 5.
Andriy Myronenko. 3D MRI brain tumor segmentation using autoencoder regularization. In International MICCAI Brainlesion Workshop, pp. 311-320. Springer, 2018. 1,2.
Harry A Quigley and Aimee T Broman. The number of people with glaucoma worldwide in 2010 and 2020. British Journal of Ophthalmology, 90(3):262-267, 2006. 1.
Maryanne Romero, Vivien Lim, and Seng Chee Loon. Reliability of graders and comparison with an automated algorithm for vertical cup-disc ratio grading in fundus photographs.Ann Acad Med Singapore, 48:282-9, 2019. 1.
Olaf Ronneberger, Philipp Fischer, and Thomas Brox. UNet: Convolutional networks for biomedical image segmentation. In International Conference on Medical Image Computing and Computer Assisted Intervention, pp. 234-241,2015. 3, 6, 7, 8.
Mike Schaekermann, Graeme Beaton, Minahz Habib, Andrew Lim, Kate Larson, and Edith Law. Understanding expert disagreement in medical data analysis through structured adjudication. Proceedings of the ACM on Human-Computer Interaction, 3:1-23, 2019. 1.
Xingjian Shi, Zhourong Chen, Hao Wang, Dit-Yan Yeung, Wai kin Wong, and Wang chun Woo. Convolutional LSTM network: a machine learning approach for precipitation nowcasting. In Advances in Neural Information Processing Systems,pp. 802-810, 2015. 4.
Karen Simonyan and Andrew Zisserman. Very deep convolutional networks for large-scale image recognition. International Conference on Learning Representations, 2015. 5.
Carole H Sudre, Beatriz Gomez Anson, Silvia Ingala, Chris D Lane, Daniel Jimenez, Lukas Haider, Thomas Varsavsky, Ryutaro Tanno, Lorna Smith, S'ebastien Ourselin, et al. Let's agree to disagree: Learning highly debatable multirater labelling. In International Conference on Medical Image Computing and Computer Assisted Intervention, pp. 665-673. Springer, 2019. 2.
Yih Chung Tham, Xiang Li, Tien YWong, Harry A Quigley, Tin Aung, and Ching Yu Cheng. Global prevalence of glaucoma and projections of glaucoma burden through 2040: a systematic review and meta-analysis. Ophthalmology, 121(11):2081-2090, 2014. 1.
Raviteja Vemulapalli, Oncel Tuzel, Ming-Yu Liu, and Rama Chellapa. Gaussian conditional random field network for semantic segmentation. In Proceedings of the IEEE Conference on Computer Vision and Pattern Recognition, Jun. 2016.6.
ShujunWang, Lequan Yu, Kang Li, Xin Yang, Chi-Wing Fu, and Pheng-Ann Heng. Boundary and entropy-driven adversarial learning for fundus image segmentation. In International Conference on Medical Image Computing and Computer Assisted Intervention, pp. 102-110, 2019. 2, 7.
Shujun Wang, Lequan Yu, Xin Yang, Chi-Wing Fu, and Pheng-Ann Heng. Patch-based output space adversarial learning for joint optic disc and cup segmentation. IEEE Transactions on Medical Imaging, 38(11):2485-2495, 2019.2,7.
Yi Wang, Zijun Deng, Xiaowei Hu, Lei Zhu, Xin Yang, Xuemiao Xu, Pheng-Ann Heng, and Dong Ni. Deep attentional features for prostate segmentation in ultrasound. In International Conference on Medical Image Computing and Computer Assisted Intervention, pp. 523-530. Springer,2018.8.
Yi Wang, Haoran Dou, Xiaowei Hu, Lei Zhu, Xin Yang, Ming Xu, Jing Qin, Pheng-Ann Heng, Tianfu Wang, and Dong Ni. Deep attentive features for prostate segmentation in 3D transrectal ultrasound. IEEE Transactions on Medical Imaging, 38(12):2768-2778, 2019. 2.
Sanghyun Woo, Jongchan Park, Joon-Young Lee, and In So Kweon. CBAM: Convolutional block attention module. In Proceedings of the European Conference on Computer Vision, pp. 3-19, 2018. 5.
Lequan Yu, Xin Yang, Hao Chen, Jing Qin, Pheng-Ann Heng, et al. Volumetric ConvNets with mixed residual connections for automated prostate segmentation from 3D MR images. In AAAI Conference on Artificial Intelligence, vol. 17, pp. 36-72, 2017. 1.
Shuang Yu, Di Xiao, Shaun Frost, and Yogesan Kanagasingam. Robust optic disc and cup segmentation with deep learning for glaucoma detection. Computerized Medical Imaging and Graphics, 74:61-71, 2019. 6, 7.
Shuang Yu, Hong-Yu Zhou, Kai Ma, Cheng Bian, Chunyan Chu, Hanruo Liu, and Yefeng Zheng. Difficulty-aware glaucoma classification with multi-rater consensus modeling. In International Conference on Medical Image Computing and Computer Assisted Intervention, pp. 741-750. Springer,2020.2.
Qinming Zhang, Luyan Liu, Kai Ma, Cheng Zhuo, and Yefeng Zheng. Cross-denoising network against corrupted labels in medical image segmentation with domain shift. In International Joint Conference on Artificial Intelligence,2020. 1, 2.

* cited by examiner

IMAGE SEGMENTATION METHOD AND APPARATUS, COMPUTER DEVICE, AND STORAGE MEDIUM

CROSS-REFERENCES TO RELATED APPLICATIONS

This application is a continuation application of PCT Patent Application No. PCT/CN2022/077951, entitled "IMAGE SEGMENTATION METHOD AND APPARATUS, COMPUTER DEVICE AND STORAGE MEDIUM" and filed on Feb. 25, 2022, which claims priority to Chinese Patent Application No. 202110234267.7, entitled "IMAGE SEGMENTATION METHOD AND APPARATUS, COMPUTER DEVICE, AND STORAGE MEDIUM" filed on Mar. 3, 2021, the entire contents of both of which are incorporated herein by reference.

FIELD OF THE TECHNOLOGY

Embodiments of the present disclosure relate to the field of computer technologies, and in particular, to an image segmentation method and apparatus, a computer device, and a storage medium.

BACKGROUND OF THE DISCLOSURE

With the development of computer technologies, the image segmentation technology is increasingly widely applied, and image segmentation is required in many fields. For example, in the medical field, an image of a body part can be extracted from an image by the image segmentation technology.

SUMMARY

Embodiments of the present disclosure provide an image segmentation method and apparatus, a computer device, and a storage medium, which can improve the accuracy of image segmentation. The technical solutions include the following content:

According to an aspect, an image segmentation method is provided, and is performed by a computer device. The method includes: encoding an original image based on a prior knowledge vector, to obtain a target feature map, the original image comprising a target object, the prior knowledge vector comprising a plurality of prior knowledge weights, each of the prior knowledge weights representing accuracy of a corresponding rater labeling a region of an object in an image; decoding the target feature map, to obtain a first segmented image of the original image, the first segmented image indicating a target region in which the target object is located in the original image; performing image reconstruction on the first segmented image based on the prior knowledge vector, to obtain a plurality of labeled segmented images, wherein one labeled segmented image corresponds to one prior knowledge weight and indicates a target region labeled by a corresponding rater; and processing the target feature map based on the plurality of labeled segmented images, to obtain a second segmented image of the original image.

According to another aspect, an image segmentation apparatus is provided, and includes: an encoding module, configured to encode an original image based on a prior knowledge vector, to obtain a target feature map, the original image including a target object, the prior knowledge vector including a plurality of prior knowledge weights, each of the prior knowledge weights representing accuracy of a corresponding rater labeling a region of an object in an image; a decoding module, configured to decode the target feature map, to obtain a first segmented image of the original image, the first segmented image indicating a target region in which the target object is located in the original image; a reconstruction module, configured to perform image reconstruction on the first segmented image based on the prior knowledge vector, to obtain a plurality of labeled segmented images, wherein one labeled segmented image corresponds to one prior knowledge weight and indicates a target region labeled by a corresponding rater; and a processing module, configured to process the target feature map based on the plurality of labeled segmented images, to obtain a second segmented image of the original image.

According to another aspect, a computer device is provided, and includes a processor and a memory, the memory storing at least one computer program, the at least one computer program being loaded and executed by the processor to implement the operations performed by the image segmentation method according to the foregoing aspect.

According to another aspect, a non-transitory computer-readable storage medium is provided, storing at least one computer program, the at least one computer program being loaded and executed by a processor to implement the operations performed by the image segmentation method according to the foregoing aspect.

According to still another aspect, a computer program product or a computer program is provided, storing computer program code, the computer program code being stored in a computer-readable storage medium. A processor of a computer device reads the computer program code from the computer-readable storage medium, and the processor executes the computer program code, to cause the computer device to implement the operations performed by the image segmentation method according to the foregoing aspect.

According to the method and apparatus, the computer device, and the storage medium provided in the embodiments of the present disclosure, in a process of segmenting an original image, prior knowledge weights used for representing labeling accuracy of a plurality of raters are introduced, and labeled segmented images matching the plurality of raters are reconstructed to indicate a target region in which a target object is located in the original image, that is, a plurality of labeling results of the plurality of raters for the original image are reconstructed; and then a second segmented image of the original image is obtained through the plurality of labeled segmented images and a target feature map of the original image, so that the labeling results corresponding to the plurality of raters are fused into the second segmented image, thereby ensuring the accuracy of the second segmented image, and then improving the accuracy of image segmentation.

BRIEF DESCRIPTION OF THE DRAWINGS

To describe the technical solutions in the embodiments of the present disclosure more clearly, the following briefly introduces the accompanying drawings required for describing the embodiments. Apparently, the accompanying drawings in the following description show only some embodiments of the present disclosure, and a person of ordinary skill in the art may still derive other accompanying drawings from the accompanying drawings without creative efforts.

DESCRIPTION OF EMBODIMENTS

Figure 1:
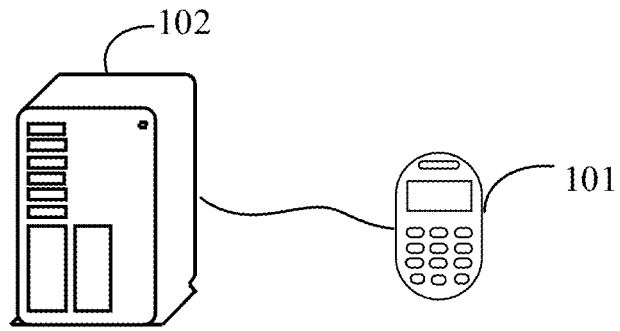
FIG. 1 is a schematic structural diagram of an implementation environment according to an embodiment of the present disclosure.

To make objectives, technical solutions, and advantages of the embodiments of the present disclosure clearer, the following further describes in detail implementations of the present disclosure with reference to the accompanying drawings.

The terms "first", "second", "third", "fourth", "fifth", "sixth", and the like used in the present disclosure may be used for describing various concepts in this specification. However, the concepts are not limited by the terms unless otherwise specified. The terms are merely used for distinguishing one concept from another concept. For example, without departing from the scope of the present disclosure, a first feature map may be referred to as a second feature map, and similarly, the second feature map may be referred to as the first feature map.

For the terms "at least one", "a plurality of", "each", and "any" used in the present disclosure, "at least one" refers to "one", "two", or "more", "a plurality of" refers to "two" or "more", "each" refers to "each of a plurality of corresponding", and "any" refers to "any one of a plurality of". For example, when "a plurality of prior knowledge weights" refers to "three prior knowledge weights", "each" refers to "each of the three prior knowledge weights", and "any" refers to "any one of the three prior knowledge weights", that is, may the first prior knowledge weight, the second prior knowledge weight, or the third prior knowledge weight.

Usually, when segmentation processing is performed on an original image, the original image is first encoded to obtain a feature map of the original image, and the feature map is decoded to obtain a segmented image, where the segmented image can indicate a region in which a target object is located in the original image. However, the image segmentation manner is simple, and the accuracy of image segmentation is poor.

An image segmentation method provided in the embodiments of the present disclosure is performed by a computer device. In some embodiments, the computer device is a terminal or a server. In some embodiments, the server may be an independent physical server, or may be a server cluster or a distributed system formed by a plurality of physical servers, or may be a cloud server that provides a basic cloud computing service such as a cloud service, a cloud database, cloud computing, a cloud function, cloud storage, a network service, cloud communication, a middleware service, a domain name service, a security service, a content delivery network (CDN), big data, and an artificial intelligence platform. In some embodiments, the terminal may be a smartphone, a tablet computer, a notebook computer, a desktop computer, a smart speaker, a smartwatch, or the like, but is not limited thereto.

In one embodiment, a plurality of servers may form a blockchain, the servers are nodes on the blockchain, and the image segmentation method provided in the embodiments of the present disclosure can be applied to any server in the blockchain. By using the image segmentation method provided in the embodiments of the present disclosure, the server can segment any image, and store an obtained segmented image in the blockchain, to share with other servers in the blockchain.

FIG. 1 is a schematic diagram of an implementation environment according to an embodiment of the present disclosure. Referring to FIG. 1, the implementation environment includes a terminal 101 and a server 102. The terminal 101 and the server 102 is connected by a wired or wireless network. A target application to which the server 102 provides services is installed on the terminal 101, and the terminal 101 can realize functions such as data transmission and message interaction through the target application. In some embodiments, the target application is a target application in an operating system of the terminal 101, or an application provided by a third party. For example, the target application is a medical diagnosis application, and the medical diagnosis application has an image segmentation function. Certainly, the medical diagnosis application also can have other functions, such as a comment function, and a navigation function.

The terminal 101 is configured to log in to the target application based on a user identifier, and sends an original image to the server 102 through the target application. The server 102 is configured to receive the original image sent by the terminal 101, perform image segmentation on the original image to obtain a segmented image of the original image, and return the obtained segmented image to the terminal 101. The terminal 101 can display the received segmented image.

The method provided in the embodiments of the present disclosure is applicable to a plurality of scenarios.

For example, in a medical scenario:

The terminal captures eyes of a user to obtain an eye image (e.g., a fundus image) of the user, and sends the eye image to a server with an image segmentation function. After receiving the eye image, the server obtains a segmented image of the eye image by the image segmentation method provided in the embodiments of the present disclosure, to determine regions in which an optic cup and an optic disc are located in the eye image. Then, a doctor can determine an eye state of the user according to regions in which the optic cup and the optic disc are located in the segmented image.

Figure 2:
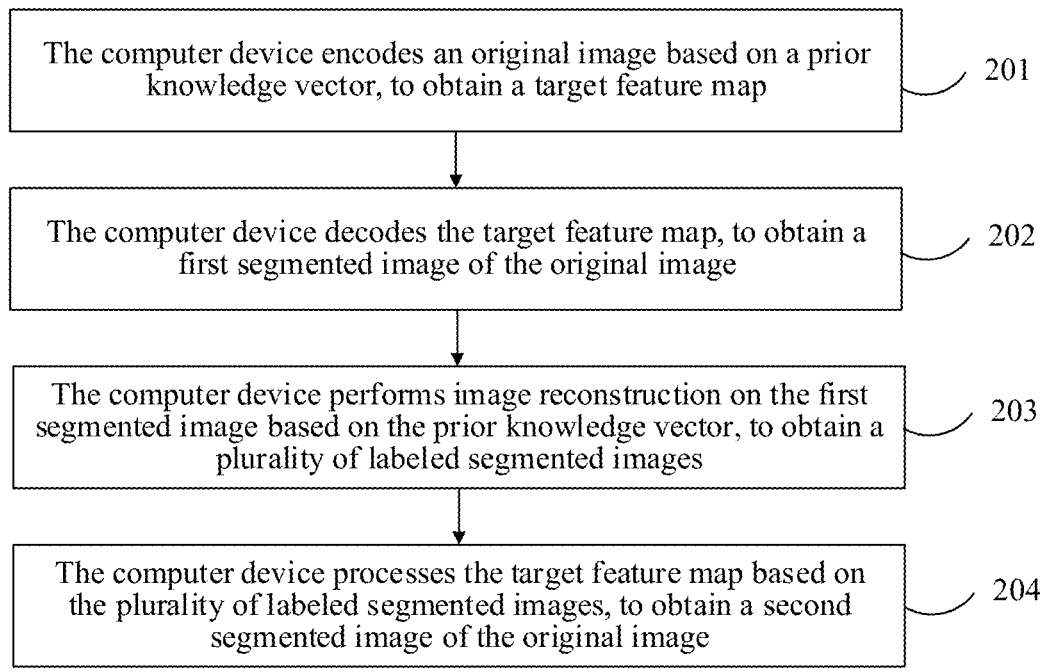
FIG. 2 is a flowchart of an image segmentation method according to an embodiment of the present disclosure.

FIG. 2 is a flowchart of an image segmentation method according to an embodiment of the present disclosure. The method is performed by a computer device. As shown in FIG. 2, the method includes the following steps.

201. The computer device encodes an original image based on a prior knowledge vector, to obtain a target feature map.

The original image includes a target object, and the original image is any image. For example, in a medical scenario, the original image is a medical image, and the target object is a body part. For example, the original image is an eye image, and the target object is an optic cup or an optic disc in the eyes; or, the original image is a human lung image, and the target object is a diseased object in the human lung. The prior knowledge vector includes a plurality of prior knowledge weights, each of the prior knowledge weights is used for representing a labeling accuracy, the labeling accuracy describes how accurate a person (hereinafter also referred to as a rater) labels a region of an object in an image, and the target feature map is used for representing feature information included in the original image. The prior knowledge weight of a rater can indicate expertness of the rater.

202. The computer device decodes the target feature map, to obtain a first segmented image of the original image.

The first segmented image indicates a target region in which the target object is located in the original image. Because the target feature map includes the feature information of the original image and the prior knowledge vector is fused into the target feature map, the first segmented image obtained by decoding is equivalent to a segmented image obtained after labeling results of a plurality of raters are fused, and the plurality of raters are raters corresponding to the plurality of prior knowledge weights.

203. The computer device performs image reconstruction on the first segmented image based on the prior knowledge vector, to obtain a plurality of labeled segmented images.

Each of the labeled segmented images corresponds to one prior knowledge weight, and each of the labeled segmented images indicates a target region labeled by a corresponding rater. Because different raters have different expertness, the target regions indicated by the plurality of labeled segmented images may have differences. The first segmented image is equivalent to the segmented image obtained after the labeling results of the plurality of raters are fused. The labeled segmented images matching the plurality of raters are reconstructed through the plurality of prior knowledge weights in the prior knowledge vector and the first segmented image, to indicate the target region in which the target object is located in the original image, so as to subsequently update the segmented image of the original image based on the plurality of reconstructed labeled segmented images, to improve the accuracy of the segmented image.

204. The computer device processes the target feature map based on the plurality of labeled segmented images, to obtain a second segmented image of the original image.

Because each of the labeled segmented images corresponds to one prior knowledge weight and each of the labeled segmented images represents a labeling result of the corresponding rater labeling the original image, the target feature map is processed based on the plurality of labeled segmented images, thereby improving the accuracy of the second segmented image.

According to the method provided in this embodiment of the present disclosure, in a process of segmenting an original image, prior knowledge weights used for representing labeling accuracy of a plurality of raters are introduced, and labeled segmented images matching the plurality of raters are reconstructed to indicate a target region in which a target object is located in the original image, that is, a plurality of labeling results of the plurality of raters for the original image are reconstructed; and then a second segmented image of the original image is obtained through the plurality of labeled segmented images and a target feature map of the original image, so that the labeling results corresponding to the plurality of raters are fused into the second segmented image, thereby ensuring the accuracy of the second segmented image, and then improving the accuracy of image segmentation.

Figure 3:
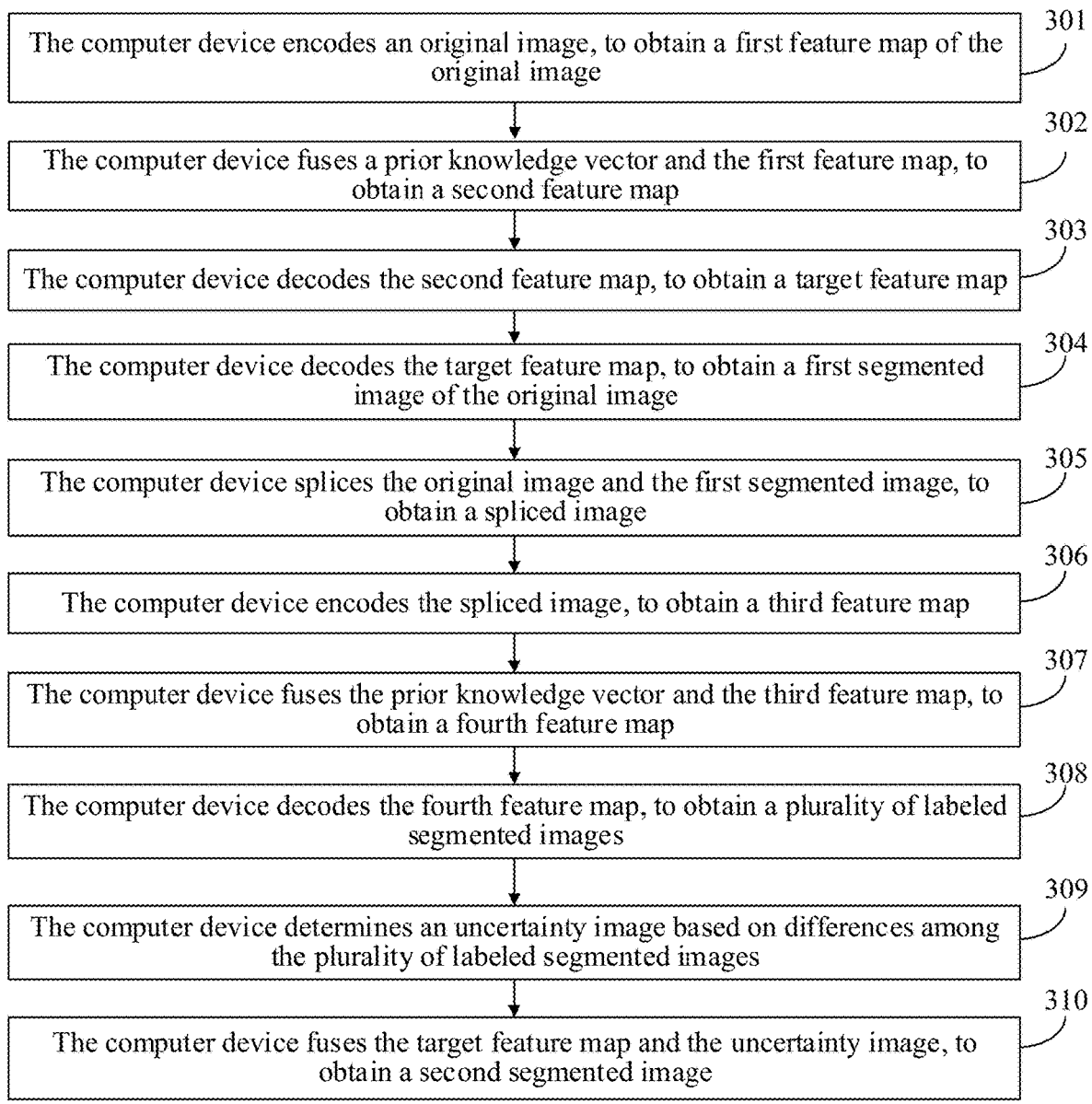
FIG. 3 is a flowchart of an image segmentation method according to an embodiment of the present disclosure.

FIG. 3 is a flowchart of an image segmentation method according to an embodiment of the present disclosure. The method is performed by a computer device. As shown in FIG. 3, the method includes the following steps.

301. The computer device encodes an original image, to obtain a first feature map of the original image.

The first feature map is used for representing feature information included in the original image. The original image includes a target object, and the original image is any image. For example, in a medical scenario, the original image is a medical image, and the target object is a body part. For example, the original image is an eye image, and the target object is an optic cup or an optic disc in the eyes; or, the original image is a human lung image, and the target object is a diseased object in the human lung.

In one embodiment, step 301 includes: encoding the original image by invoking a first encoding submodel in a first image segmentation model, to obtain the first feature map of the original image.

The first image segmentation model is a model configured to obtain a segmented image of the original image, for example, the first image segmentation model is a U-Net model (a convolutional neural network for two-dimensional image segmentation). The first encoding submodel is configured to obtain the feature map of the original image. For example, the first encoding submodel is an encoder in the U-Net model. The original image is encoded by the first encoding submodel in the first image segmentation model, so that the first feature map includes the feature information of the original image, so as to ensure the accuracy of the obtained first feature map.

In some embodiments, if the first encoding submodel includes a plurality of first convolution modules, a process of obtaining the first feature map includes: invoking, according to an arrangement order of the plurality of first convolution modules, an initial first convolution module to encode the original image, to obtain an initial first reference feature map; invoking a current first convolution module to encode a first reference feature map outputted by a previous first convolution module, to obtain a first reference feature map corresponding to the current first convolution module, until a first reference feature map outputted by a last first convolution module is obtained; and determining the first reference feature map outputted by the last first convolution module as the first feature map.

In the plurality of first convolution modules included in the first encoding submodel, sizes of first reference feature maps outputted by the plurality of first convolution modules are gradually reduced according to the arrangement order of the plurality of first convolution modules. Through the plurality of first convolution modules in the encoding submodel, the original image is encoded according to a plurality of sizes, that is, the encoding submodel gradually enhances features included in the feature map by down-sampling, to improve the accuracy of the first feature map.

In some embodiments, the first encoding submodel includes n first convolution modules, an input of an initial first convolution module is the original image, and an input of an ith convolution module is a first reference feature map outputted by an (i−1)th convolution module, where i is an integer greater than 1 and not greater than n, and n is an integer greater than 1. Therefore, the process of obtaining the first feature map includes: invoking the initial first convolution module to encode the original image, to obtain an initial first reference feature map; invoking the ith first convolution module to encode an (i−1)th first reference feature map, to obtain an ith first reference feature map, until an nth first reference feature map is obtained; and determining the nth first reference feature map as the first feature map.

Sizes of first reference feature maps outputted by the n first convolution modules are gradually reduced according to an arrangement order from the initial first convolution module to an nth first convolution module.

302. The computer device fuses a prior knowledge vector and the first feature map, to obtain a second feature map.

The prior knowledge vector includes a plurality of prior knowledge weights, each of the prior knowledge weights is used for representing a labeling accuracy, the labeling accuracy describes how accurate a person (hereinafter also referred to as a rater) labels a region of an object in an image, and the prior knowledge weight can reflect a expertness of the corresponding rater. Because expertness of the plurality of raters are different, a prior knowledge weight corresponding to each rater is also different. A greater prior knowledge weight indicates a higher expertness of a corresponding rater, that is, higher accuracy with which the rater labels a region in which an object is located in an image. A lower prior knowledge weight indicates a higher expertness of a corresponding rater, that is, lower accuracy with which the rater labels a region in which an object is located in an image.

In some embodiments, the prior knowledge vector is arbitrarily set, for example, the prior knowledge vector is [0.1, 0.1, 0.4, 0.4], that is, the prior knowledge vector includes prior knowledge weights corresponding to four raters, prior knowledge weights corresponding to two raters are 0.1, and prior knowledge weights corresponding to two raters are 0.4.

The prior knowledge vector and the first feature map are fused, so that the obtained second feature map includes features of the original image, and the prior knowledge weights corresponding to the plurality of raters are also fused into the second feature map. In this way, the features included in the second feature map are dynamically associated with the prior knowledge vector, and the features included in the second feature map are affected by the prior knowledge vector, thereby enhancing the dynamic representation capability of the features included in the second feature map, and improving the accuracy of the features included in the second feature map.

In one embodiment, step 302 includes: fusing the prior knowledge vector and the first feature map by invoking a expertise-aware inferring submodel in the first image segmentation model, to obtain the second feature map.

Figure 4:
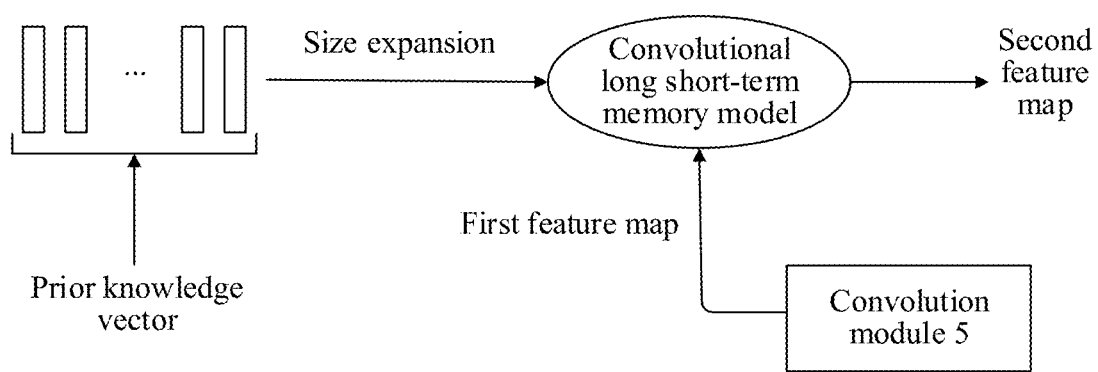
FIG. 4 is a flowchart of a method for obtaining a second feature map according to an embodiment of the present disclosure.
Figure 5:
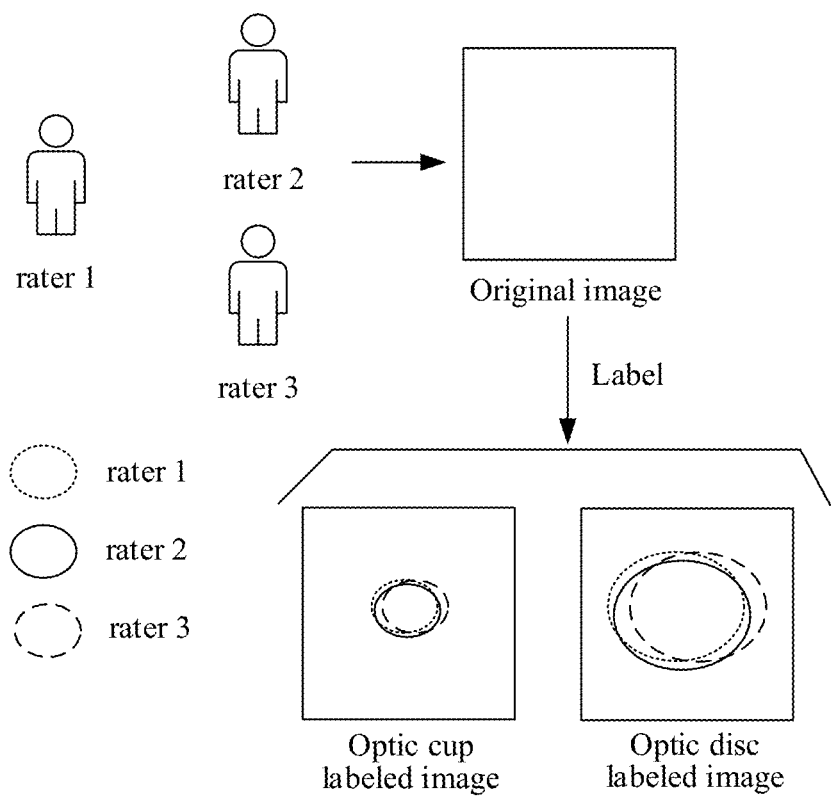
FIG. 5 is a schematic diagram of labeled images of a plurality of raters according to an embodiment of the present disclosure.

The expertise-aware inferring submodel is configured to fuse the prior knowledge vector and the first feature map. For example, the expertise-aware inferring submodel is a convolutional long short-term memory (ConvLSTM) model. The prior knowledge vector and the first feature map of the original image are fused by the expertise-aware inferring submodel, thereby enhancing the dynamic representation capability of the features included in the second feature map. As shown in FIG. 4, size expansion is performed on the prior knowledge vector, so that the prior knowledge vector after size expansion has a same size with the first feature map. Then, the expanded prior knowledge vector and the first feature map are fused by the ConvLSTM model, to enhance the features included in the second feature map, and obtain a fused second feature map.

In some embodiments, the first feature map, the prior knowledge vector, and the second feature map meet the following relationship:

$$h_t = \overset{t}{\circlearrowleft} \text{ConvLSTM}(f^s, h_{t-1}), t=1, 2, \ldots, T$$

where, $h_t$ is used for representing a feature map after enhancement, $f^s$ is used for representing the first feature map ConvLSTM(•), is used for representing the ConvLSTM model, $h_{t-1}$ is used for representing a feature map before enhancement, t is used for representing rounds of feature enhancement iteration, $\circlearrowleft$ is used for representing iteration processing, and T is a positive integer not less than 2; when t=1, $h_0$ is the prior knowledge vector; and when t=T, $h_T$ is the second feature map.

303. The computer device decodes the second feature map, to obtain a target feature map.

The target feature map is used for representing the feature information included in the original image. After the second feature map is obtained, the features included in the feature map are refined by decoding, thereby improving the accuracy of the features included in the target feature map.

In one embodiment, step 303 includes: decoding the second feature map by invoking a first decoding submodel in the first image segmentation model, to obtain the target feature map.

The first decoding submodel is configured to enhance the features included in the feature map. For example, the first decoding submodel is a decoder in the U-Net model.

In some embodiments, the first image segmentation model further includes the first encoding submodel. If the first encoding submodel includes a plurality of first convolution modules and the first decoding submodel includes a plurality of second convolution modules, a process of obtaining the target feature map includes: invoking, according to an arrangement order of the plurality of second convolution modules, a first second convolution module to decode the second feature map, to obtain a first second reference feature map; invoking a current second convolution module to decode a second reference feature map outputted by a previous second convolution module and a first reference feature map whose size is equal to that of the second reference feature map, to obtain a second reference feature map corresponding to the current second convolution module, until a second reference feature map outputted by a last second convolution module is obtained; and determining the second reference feature map outputted by the last second convolution module as the target feature map.

In the plurality of second convolution modules included in the first decoding submodel, sizes of second reference feature maps outputted by the plurality of second convolution modules are gradually increased according to the arrangement order of the plurality of second convolution modules. Through the plurality of second convolution modules in the decoding submodel, the features included in the feature map are gradually refined by up-sampling, to improve the accuracy of the features included in the target feature map.

In some embodiments, the first image segmentation model includes the first encoding submodel and the first decoding submodel; the first encoding submodel includes n first convolution modules, an input of an initial first convolution module is the original image, and an input of an ith convolution module is a first reference feature map outputted by an (i−1)th convolution module, where i is an integer greater than 1 and not greater than n, and n is an integer greater than 1; and the first decoding submodel includes n second convolution modules, an input of a first second convolution module is the second feature map, an input of an ith second convolution module is a reference feature map outputted by an (i−1)th second convolution module and a reference feature map outputted by an (n−i+1)th first convolution module, where the reference feature map outputted by the (i−1)th second convolution module has the same size with the reference feature map outputted by the (n−i+1)th first convolution module.

Therefore, based on the original image and the prior knowledge vector, the process of obtaining the target feature map includes: invoking the initial first convolution module to encode the original image, to obtain a 1st first reference feature map; invoking the ith first convolution module to encode an (i−1)th first reference feature map, to obtain an ith first reference feature map, until an nth first reference feature map is obtained; determining the nth first reference feature map as the first feature map; fusing the prior knowledge vector and the first feature map, to obtain the second feature map; invoking the first second convolution module to decode the second feature map, to obtain a first second reference feature map; invoking the ith second convolution module to decode an (i−1)th second reference feature map and an (n−i+1)th first reference feature map, to obtain an ith second reference feature map, until an nth second reference feature map is obtained; and determining the nth second reference feature map as the target feature map.

Sizes of first reference feature maps outputted by the n first convolution modules are gradually reduced according to an arrangement order from the 1st first convolution module to an nth first convolution module. Sizes of first reference feature maps outputted by the n second convolution modules are gradually increased according to an arrangement order from the first second convolution module to an nth second convolution module.

In this embodiment of the present disclosure, after the encoded first feature map of the original image and the prior knowledge vector are fused, the obtained second feature map is decoded to obtain the target feature map. In another embodiment, there is no need to perform the foregoing step 301 to step 303, and by using another manner, the original image can be encoded according to the prior knowledge vector to obtain the target feature map.

In one embodiment, the first image segmentation model is invoked to encode the original image based on the prior knowledge vector, to obtain the target feature map. The target feature map is obtained by the first image segmentation model, to improve the accuracy of the target feature map.

304. The computer device decodes the target feature map, to obtain a first segmented image of the original image.

The first segmented image indicates a target region in which the target object is located in in the original image. In some embodiments, the first segmented image includes weights corresponding to a plurality of pixel points in the original image, where the weights are used for representing possibilities of the corresponding pixel points in the target region. In the plurality of pixel points included in the first segmented image, a pixel value of each pixel point represents a weight corresponding to a pixel point located at a same position in the original image. For any position in the original image, a pixel value of a pixel point located at the same position in the first segmented image is a weight of a pixel point located at the position in the original image.

In some embodiments, the first segmented image is represented in the form of a heat map. In the first segmented image, a larger weight corresponding to a pixel point indicates a darker color corresponding to the pixel point, and a smaller weight corresponding to a pixel point indicates a lighter color corresponding to the pixel point. For example, in the first segmented image, when a weight is 0, a color corresponding to a pixel point corresponding to the weight is blue; when a weight is 1, a color corresponding to a pixel point corresponding to the weight is red; and when a weight is between 0 and 1, a color corresponding to a pixel point corresponding to the weight is a transition color between blue and red. For example, when a weight changes from 0 to 1, a color corresponding to a pixel point corresponding to the weight gradually changes from blue to red.

Because the target feature map includes the feature information of the original image and the prior knowledge vector is fused into the target feature map, the first segmented image is obtained by decoding the target feature map, and the first segmented image is equivalent to a segmented image obtained after labeling results of a plurality of raters are fused, and the plurality of raters are raters corresponding to the plurality of prior knowledge weights.

In one embodiment, step 304 includes: decoding the target feature map by invoking the first image segmentation model, to obtain the first segmented image of the original image.

In some embodiments, a convolution submodel in the first image segmentation model is invoked to perform convolution on the target feature map, to obtain the first segmented image.

305. The computer device concatenates the original image and the first segmented image, to obtain a concatenated image.

The first segmented image indicates the target region in which the target object is located in the original image. Therefore, the original image and the first segmented image are concatenated, so that the concatenated image not only includes the information included in the original image, but also includes information used for indicating the target region in which the target object is located in the original image, thereby enriching the information included in the concatenated image, so as to subsequently reconstruct a plurality of labeled segmented images.

306. The computer device encodes the concatenated image, to obtain a third feature map.

The third feature map is used for representing the feature information included in the original image and the information used for indicating the target region in which the target object is located in the original image.

In one embodiment, step 306 includes: encoding the concatenated image by invoking an encoding submodel in an image reconstruction model, to obtain the third feature map.

The image reconstruction model is configured to reconstruct labeled segmented images corresponding to the plurality of prior knowledge weights, and the encoding submodel is configured to obtain the feature map of the concatenated image. For example, the encoding submodel is an encoder in the U-Net model. The encoding submodel in the image reconstruction model is similar to the first encoding submodel in the first image segmentation model in the foregoing step 301. Details are not described herein again.

307. The computer device fuses the prior knowledge vector and the third feature map, to obtain a fourth feature map.

The prior knowledge vector and the third feature map are fused, so that the fourth feature map includes the feature information included in the original image, and the prior knowledge weights corresponding to the plurality of raters are also fused into the fourth feature map, so as to subsequently reconstruct a labeled segmented image corresponding to each prior knowledge weight according to the fourth feature map.

In one embodiment, step 307 includes: fusing the prior knowledge vector and the third feature map by invoking a fusion submodel in the image reconstruction model, to obtain the fourth feature map.

The fusion submodel is similar to the expertise-aware inferring submodel in the foregoing step 302. Details are not described herein again.

308. The computer device decodes the fourth feature map, to obtain a plurality of labeled segmented images.

Each of the labeled segmented images corresponds to one prior knowledge weight, and each of the labeled segmented images indicates a target region labeled by a corresponding rater. Because different raters have different expertness, the target regions indicated by the plurality of labeled segmented images may have differences. As shown in FIG. 4, by using the original image being an eye image as an example, three raters label an optic cup and an optic disc in the eye image. Because the three raters have different expertness, target regions indicated by optic cup labeling images and optic disc labeling images obtained by labeling have differences.

In some embodiments, each of the labeled segmented images includes first weights corresponding to a plurality of pixel points in the original image, where the first weights are used for representing possibilities of the corresponding pixel points in the target region. Therefore, through the plurality of first weights included in the labeled segmented image, the target region labeled by the corresponding rater can be determined, and the target region is a region in which the target object is located in the original image. For a plurality of pixel points included in any labeled segmented image, a pixel value of each pixel point is a first weight included in the labeled segmented image. For a pixel point located at any position in the original image, a pixel value of a pixel point located at the same position in the labeled segmented image is a first weight of a pixel point located at the position in the original image.

In this embodiment of the present disclosure, the fourth feature map includes feature information of the first segmented image and the feature information of the original image, and the prior knowledge vector is also fused into the fourth feature map; and the first segmented image is equivalent to the segmented image obtained after the labeling results of the plurality of raters are fused, and the plurality of raters are the raters corresponding to the plurality of prior knowledge weights. Therefore, the fourth feature map is processed by decoding, so that the labeled segmented images corresponding to the plurality of prior knowledge weights can be reconstructed, and the labeling results of the plurality of raters for the original image, namely, the labeled segmented images corresponding to the raters, can be restored, so as to subsequently update the segmented image of the original image.

In one embodiment, step 308 includes: decoding the fourth feature map by invoking a decoding submodel in the image reconstruction model, to obtain the plurality of labeled segmented images.

The decoding submodel is similar to the first decoding submodel in the foregoing step 303, and the first decoding submodel is included in the first image segmentation model. Details are not described herein again.

In this embodiment of the present disclosure, the original image is introduced, and the original image and the prior knowledge vector are fused, to reconstruct the plurality of labeled segmented images. In another embodiment, there is no need to perform the foregoing step 305 to step 308, and by using another manner, image reconstruction can be performed on the first segmented image based on the prior knowledge vector to obtain the plurality of labeled segmented images.

In one embodiment, the image reconstruction model is invoked to perform image reconstruction on the first segmented image based on the prior knowledge vector, to obtain the plurality of labeled segmented images. The labeled segmented images corresponding to the plurality of prior knowledge weights are reconstructed by the image reconstruction model based on the prior knowledge vector and the first segmented image, to ensure the accuracy of the labeled segmented images.

309. The computer device determines an uncertainty image based on differences among the plurality of labeled segmented images.

The uncertainty image indicates differences among target regions, and each of the target regions is a region indicated by a labeled segmented image. Each of the labeled segmented images corresponds to one prior knowledge weight, that is, each of the labeled segmented images is equivalent to a labeling result of the corresponding rater labeling the original image, and the rater is a rater corresponding to the prior knowledge weight. Because the plurality of raters have different expertness, the target regions indicated by the plurality of labeled segmented images may have differences. Therefore, the uncertainty image can be determined through the differences among the plurality of labeled segmented images, and the uncertainty image can indicate a disputed region in the plurality of target regions labeled by the plurality of raters.

In one embodiment, step 309 includes the following step 3091 to step 3094.

3091. Determine a difference value image between each of the plurality of labeled segmented images and an average value image.

The average value image is an average value image of the plurality of labeled segmented images. Each of the labeled segmented images includes first weights corresponding to a plurality of pixel points in the original image, the average value image includes an average value of a plurality of first weights corresponding to each of the pixel points in the original image, the plurality of first weights are first weights corresponding to the pixel point in the plurality of labeled segmented images, and the average value image can reflect consistency among the target regions indicated by the plurality of labeled segmented images. Each difference value image includes a plurality of difference values, each of the difference values represents a difference value between one first weight and a corresponding average value, the first weight is a weight corresponding to the difference value image in the labeled segmented image, and the average value is an average value in the average value image. After the average value image of the plurality of labeled segmented images is determined, the difference value image between each of the labeled segmented images and the average value image is determined, to obtain the plurality of difference value images.

In one embodiment, step 3091 includes: determining average values of first weights corresponding to pixel points located at same positions in the plurality of labeled segmented images; constructing the average value image based on the plurality of obtained average values; determining, for each of the labeled segmented images, difference values between a plurality of first weights in the labeled segmented image and a corresponding average value; and forming the difference value image corresponding to the labeled segmented image by the plurality of obtained difference values.

3092. Determine a square sum of pixel values of pixel points located at each of the same positions in the plurality of difference value images.

In any difference value image, a pixel value of any pixel point is a difference value between a first weight corresponding to a pixel point located at a same position as the pixel point in a labeled segmented image and an average value corresponding to a pixel point located at the same position as the pixel point in the average value image, and the labeled image corresponds to the difference value image.

For any position, squares of pixel values of pixel points located at the position in the plurality of difference value images are determined, and a sum of the squares of the pixel values corresponding to the pixel points located at the position in the plurality of difference value images is determined as a square sum of the pixel values corresponding to the position. The above manner is repeated, to obtain a square sum of pixel values corresponding to a plurality of positions.

3093. Respectively determine a square root of a ratio of the square sum corresponding to each position to a target number as a second weight of each position.

The target number is a number of the plurality of labeled segmented images, the second weight is used for representing differences among labeling results at the corresponding position in the plurality of labeled segmented images, and the labeling results represent whether pixel points corresponding to the position are located in target regions.

3094. Construct the uncertainty image based on the second weights of the plurality of positions.

The uncertainty image includes the second weights corresponding to the plurality of pixel points in the original image.

In one embodiment, the plurality of labeled segmented images and the uncertainty image meet the following relationship:

$$U_{map} = \sqrt{\frac{1}{N^0}\sum_{i^0=1}^{N^0}\left(\overline{S}_{i^0} - \frac{1}{N^0}\sum_{i^0=1}^{N^0}\overline{S}_{i^0}\right)^2}$$

where, $U_{map}$ represents the uncertainty image, $N^0$ represents the number of the plurality of the labeled segmented images, and $N^0$ is a positive integer not less than 2; $i^0$ represents a sequence number of a labeled segmented image in the plurality of labeled segmented images, and $i^0$ is greater than or equal to 1 and less than or equal to $N^0$; and $\overline{S}_{i^0}$ represents an $i^0_{th}$ labeled segmented image.

310. The computer device fuses the target feature map and the uncertainty image, to obtain a second segmented image.

The uncertainty image can indicate the differences among the plurality of target regions, each of the target regions is a region indicated by a labeled segmented image, the target feature map includes the feature information of the original image, and the prior knowledge vector is also fused into the target feature map. Therefore, the target feature map and the uncertainty image are fused, so that uncertain regions in the plurality of labeled segmented images can be distinguished, to improve the accuracy of target regions indicated by the second segmented image.

In one embodiment, step 310 includes the following step 3101 to step 3105.

3101. Determine an average value image of the plurality of labeled segmented images.

This step is similar to the manner for determining the average value image the foregoing step 3091. Details are not described herein again.

3102. Determine a product of the target feature map and the uncertainty image, and determine a sum of the determined product and the target feature map as a first fused feature map.

The first fused feature map is used for representing inconsistent information among the plurality of labeled segmented images, and the plurality of labeled segmented images correspond to the plurality of prior knowledge weights. After the product of the target feature map and the uncertainty image is determined, the sum of the determined product and the target feature map is determined as the first fused feature map. The first fused feature map is obtained, so that features of the target feature map in uncertain regions are enhanced. The uncertain regions are regions indicated by the uncertainty image, to improve the accuracy of the first fused feature map.

In one embodiment, step 3102 includes: determining a pixel level product of the target feature map and the uncertainty image, and determining a pixel level sum of the determined product and the target feature map as the first fused feature map. The pixel level product is a product of pixel values of pixel points located at same positions in the target feature map and the uncertainty image, and the pixel level sum is a sum value of the obtained product and pixel values of pixel points located at same positions in the target feature map.

In one embodiment, before step 3102, the method further includes: performing smoothing on the uncertainty image, and performing maximum value processing on the uncertainty image after smoothing.

The smoothing can use Gaussian smoothing. A plurality of weight values included in the uncertainty image after smoothing may change. Therefore, through the maximum value processing manner, the uncertainty image after smoothing is compared with the uncertainty image before smoothing. For any same position in the uncertainty image after smoothing and the uncertainty image before smoothing, a maximum value of two weights corresponding to the position is determined as a weight obtained after performing a maximum value operation on the position. The foregoing method is repeated, to obtain the uncertainty image after maximum value processing. Through the smoothing manner, the plurality of weights included in the uncertainty image tend to be smooth, and the transition effect is achieved, to expand the coverage of the uncertain regions, so as to effectively perceive and capture the inconsistent regions among the plurality of labeled segmented images. Through maximum value processing, the accuracy of the weights included in the uncertainty image is ensured, and the accuracy of the uncertainty image is improved.

In some embodiments, smoothing is performed on the uncertainty image, and maximum value processing is performed on the uncertainty image after smoothing, to meet the following relationship:

$$\text{Soft}(U\text{map}) = \Omega_{max}(F_{Gauss}(U_{map}, k), U_{map})$$

where, Soft(Umap) represents the uncertainty image after maximum value processing, and $\Omega_{max}$ max represents a maximum function used for restoring a higher pixel value of a same position in the uncertainty image after smoothing and the original uncertainty image; and $F_{Gauss}$ is used for representing a convolution operation with a Gaussian kernel of k, and $U_{map}$ represents the original uncertainty image.

3103. Determine a product of the target feature map and the average value image, and determine a sum of the determined product and the target feature map as a second fused feature map.

The second fused feature map is used for representing consistent information among the plurality of labeled segmented images, and the plurality of labeled segmented images correspond to the plurality of prior knowledge weights. After the product of the target feature map and the average value image is determined, the sum of the determined product and the target feature map is determined as the second fused feature map. The second fused feature map is obtained, so that features in regions in which the plurality of labeled segmented images in the target feature map each are labeled as the target regions are enhanced, and the accuracy of the second fused feature map is improved.

In one embodiment, step 3103 includes: determining a pixel level product of the target feature map and the average value image, and determining a pixel level sum of the determined product and the target feature map as the second fused feature map. The pixel level product is a product of pixel values of pixel points located at same positions in the target feature map and the average value image, and the pixel level sum is a sum value of the obtained product and pixel values of pixel points located at same positions in the target feature map.

In one embodiment, before step 3103, the method further includes: performing smoothing on the average value image, and performing maximum value processing on the average value image after smoothing.

This step is similar to the process of performing smoothing on the uncertainty image and performing maximum value processing on the uncertainty image after smoothing in the foregoing step 3102. Details are not described herein again.

In this embodiment of the present disclosure, if both smoothing and maximum value processing can be performed on the uncertainty image and the average value image before performing the foregoing step 3102 and step 3103 to obtain the first fused feature map and the second fused feature map, the first fused feature map and the second fused feature map obtained through the foregoing step 3102 and step 3103 can meet the following relational expression:

$$\tilde{F}^j = F^1 + \text{Soft}(A_j) \otimes F^1$$

where, j is used for representing a code number, and a value of j is 1 or 2; $\tilde{F}^j$ represents a fused feature map; when j is 1, $\tilde{F}^1$ represents the first fused feature map; when j is 2, $\tilde{F}^2$ represents the second fused feature map; $F^1$ represents the target feature map, and Soft($A_j$) represents the uncertainty image or the average value image; when j is 1, Soft($A_1$) represents the uncertainty image; when j is 2 Soft($A_2$) represents the average value image; and $\otimes$ is used for representing the pixel level product.

3104. Concatenate the first fused feature map and the second fused feature map, to obtain a concatenated fused feature map.

For example, if a size of the first fused feature map is B*C1*H*W and a size of the second fused feature map is B*C2*H*W, a size of the concatenated fused feature map after concatenating is B*(C1+C2)*H*W.

3105. Perform convolution on the concatenated fused feature map, to obtain the second segmented image.

Because the concatenated fused feature map includes features of the target feature map that are enhanced in determined regions and features enhanced in the uncertain regions, determined target regions in the concatenated fused feature map are distinguished from other regions when convolution is performed on the concatenated fused feature map, so as to improve the accuracy of target regions indicated by the second segmented image, that is, improve the accuracy of the second segmented image.

In addition, if the original image is the eye image and the target object is the optic cup and the optic disc in the eyes, the obtained second segmented image indicates a region in which the optic cup is located in the eye image and a region in which the optic disc is located in the eye image. Therefore, the second segmented image meets the following relationship:

$$O = \text{Conv}_{1 \times 1}(\text{Concat}(\tilde{F}^3, \tilde{F}^4, \tilde{F}^5, \tilde{F}^6))$$

where, O represents the second segmented image, $\text{Conv}_{1 \times 1}(\bullet)$ represents convolution, and Concat($\bullet$) represents concatenating; a first fused feature map corresponding to the optic cup is $\tilde{F}^3$; a first fused feature map corresponding to the optic disc is $\tilde{F}^4$; a second fused feature map corresponding to the optic cup is $\tilde{F}^5$; and a second fused feature map corresponding to the optic disc is $\tilde{F}^6$.

In this embodiment of the present disclosure, after the uncertainty image is first obtained, the second segmented image is obtained based on the target feature map and the uncertainty image. In another embodiment, there is no need to perform the foregoing step 309 and step 310, and by using another manner, the target feature map is processed based on the plurality of labeled segmented images, to obtain the second segmented image of the original image.

Figure 6:
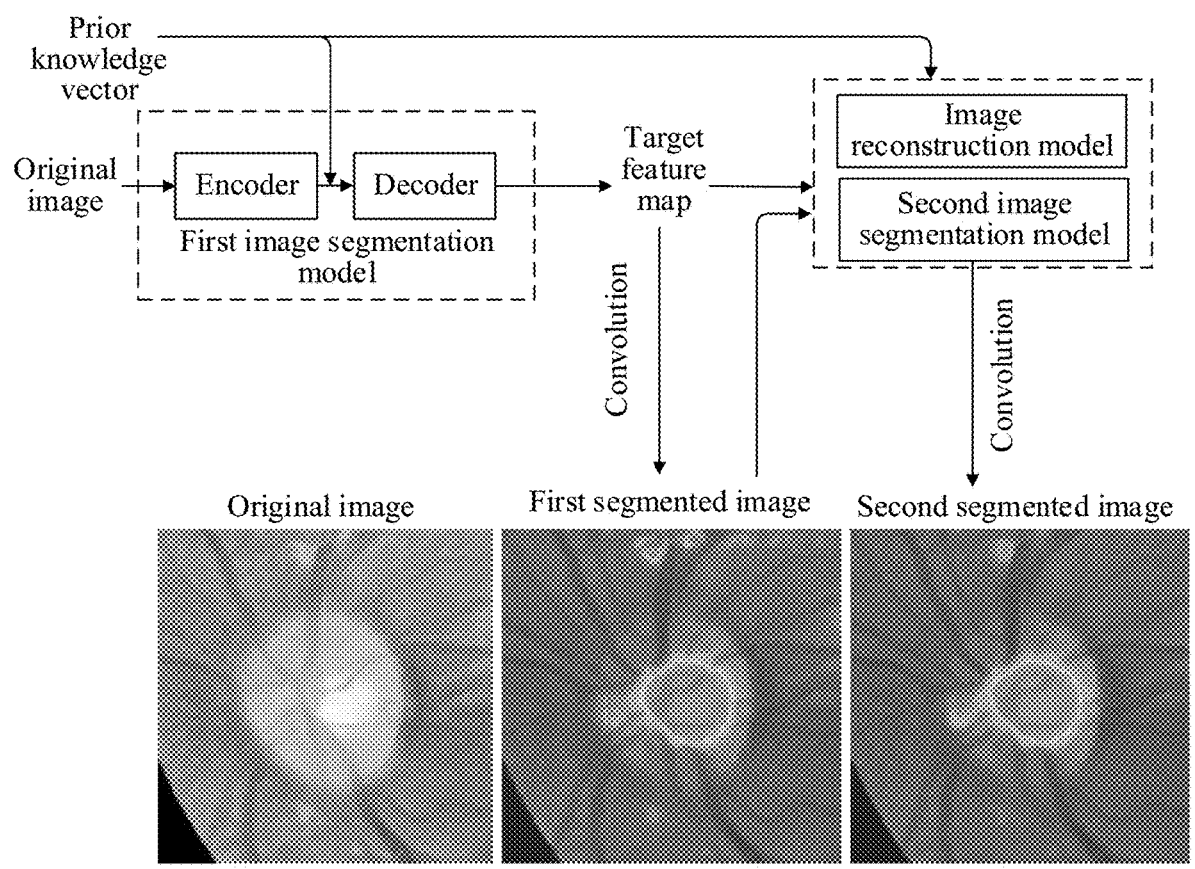
FIG. 6 is a flowchart of an image segmentation method according to an embodiment of the present disclosure.

In one embodiment, a second image segmentation model is invoked to process the target feature map based on the plurality of labeled segmented images, to obtain the second segmented image of the original image. The second image segmentation model is configured to obtain the second segmented image. The second image segmentation model uses the inconsistent information and the consistent information corresponding to the plurality of labeled segmented images, to ensure the accuracy of the second segmented image. As shown in FIG. 6, by using the original image being the eye image as an example, image segmentation is performed on the original image by the first image segmentation model, the image reconstruction model, and the second image segmentation model, to obtain the second segmented image.

According to the method provided in this embodiment of the present disclosure, in a process of segmenting an original image, prior knowledge weights used for representing labeling accuracy of a plurality of raters are introduced, and labeled segmented images matching the plurality of raters are reconstructed to indicate a target region in which a target object is located in the original image, that is, a plurality of labeling results of the plurality of raters for the original image are reconstructed; and then a second segmented image of the original image is obtained through the plurality of labeled segmented images and a target feature map of the original image, so that the labeling results corresponding to the plurality of raters are fused into the second segmented image, thereby ensuring the accuracy of the second segmented image, and then improving the accuracy of image segmentation.

In addition, through a expertise-aware inferring submodel in a first image segmentation model and a fusion submodel in an image reconstruction model, in the process of obtaining the segmented image of the original image, a prior knowledge vector can be introduced, so that the prior knowledge vector can be embedded in features of the original image, to improve the dynamic representation capability of the model.

In addition, the present disclosure provides a soft attention mechanism, which performs smoothing and maximum value processing on an uncertainty image to expand the coverage of uncertain regions, so as to effectively perceive and capture inconsistent regions among a plurality of labeled segmented images. Through maximum value processing, the accuracy of weights included in the uncertainty image is ensured, and the accuracy of the uncertainty image is improved, thereby improving the performance of subsequent image segmentation.

Figure 7:
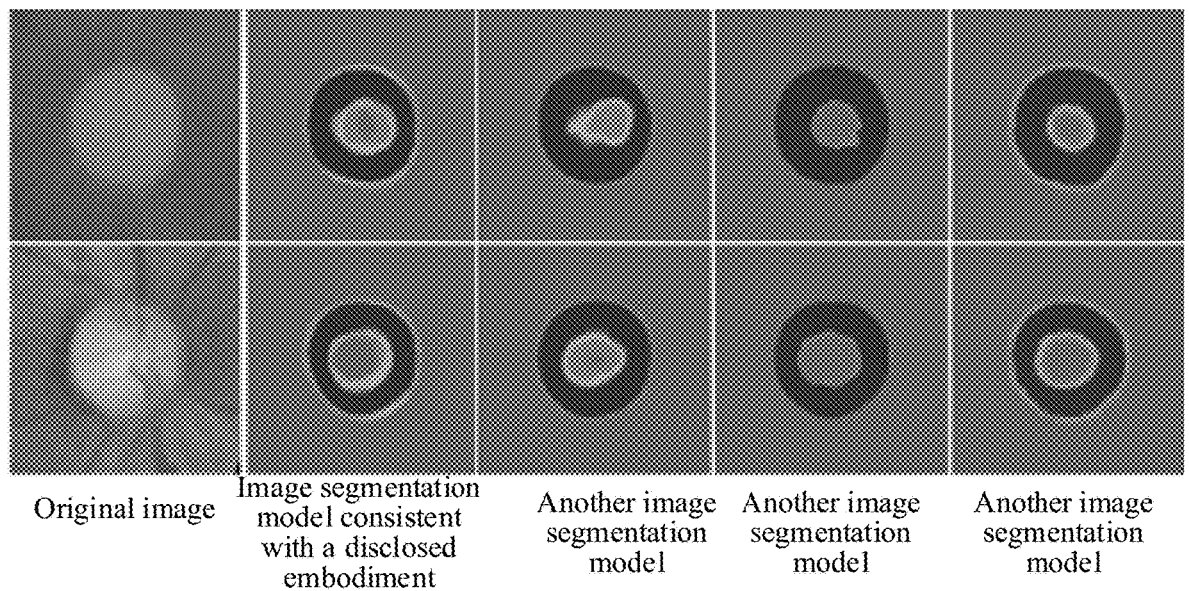
FIG. 7 is a comparison diagram of segmented images in a plurality of manners according to an embodiment of the present disclosure.

As shown in FIG. 7, image segmentation is performed on the original image by the image segmentation method provided in the present disclosure and other image segmentation models provided in the existing technologies, and obtained segmented images are compared. It can be seen from the comparison that, the segmented image obtained by the image segmentation method provided in the embodiments of the present disclosure is more accurate.

Figure 8:
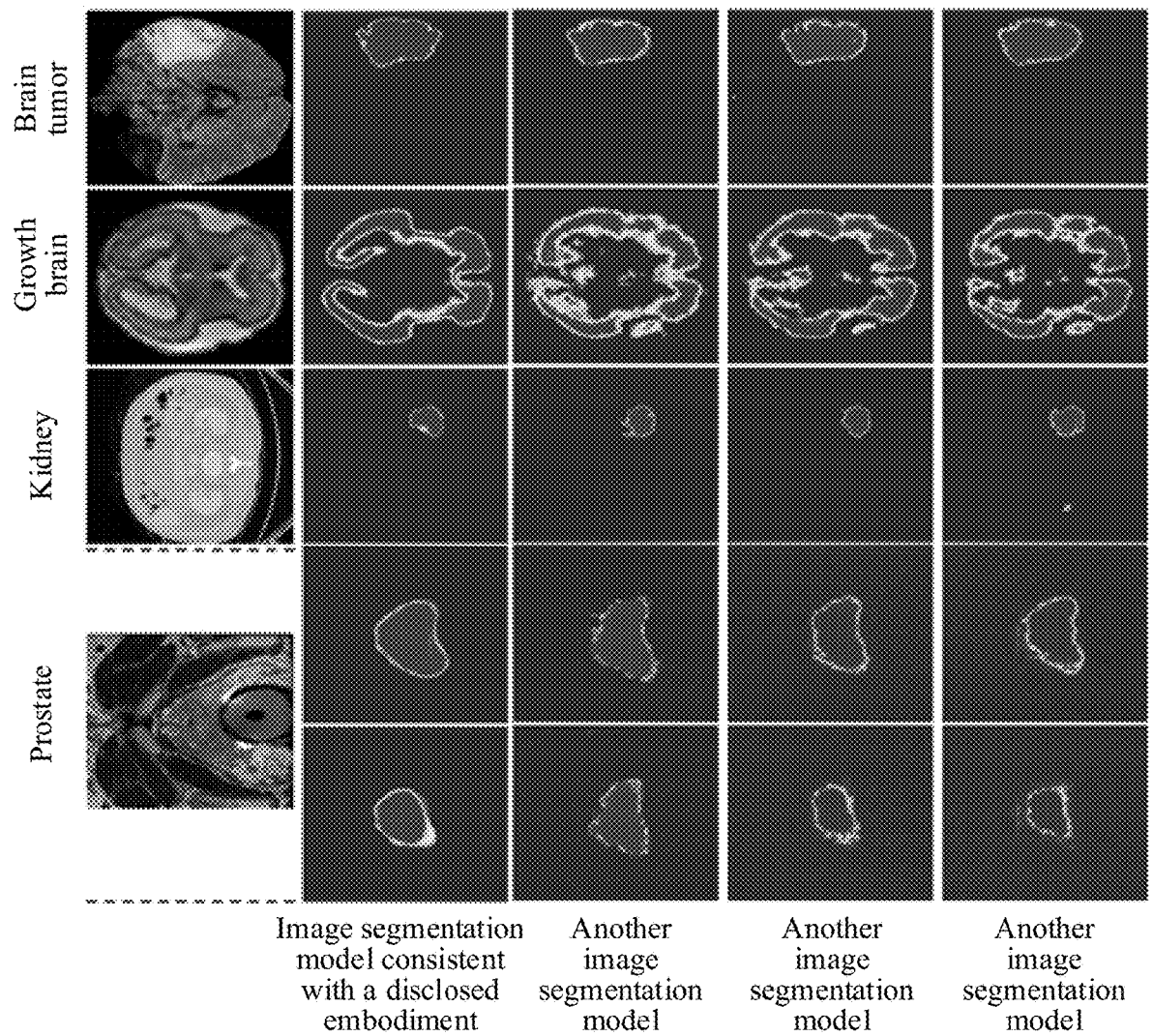
FIG. 8 is a comparison diagram of segmented images in a plurality of manners according to an embodiment of the present disclosure.

The method provided in the embodiments of the present disclosure can be applied to the medical field, and can perform image segmentation on an image in the medical field. As shown in FIG. 8, on different data sets of the medical field, segmented images obtained by the image segmentation method provided in the embodiments of the present disclosure and other image segmentation models provided in the existing technologies are compared. It can be seen from the comparison that, the segmented image obtained by the image segmentation method provided in the embodiments of the present disclosure is more accurate.

It can be seen based on the embodiment shown in FIG. 3 that, in the process of performing image segmentation on the original image, the first image segmentation model, the image reconstruction model, and the second image segmentation model can be used for performing. Before the first image segmentation model, the image reconstruction model, and the second image segmentation model are invoked, the first image segmentation model, the image reconstruction model, and the second image segmentation model need to be trained. For the training process, reference is made to the following embodiments.

Figure 9:
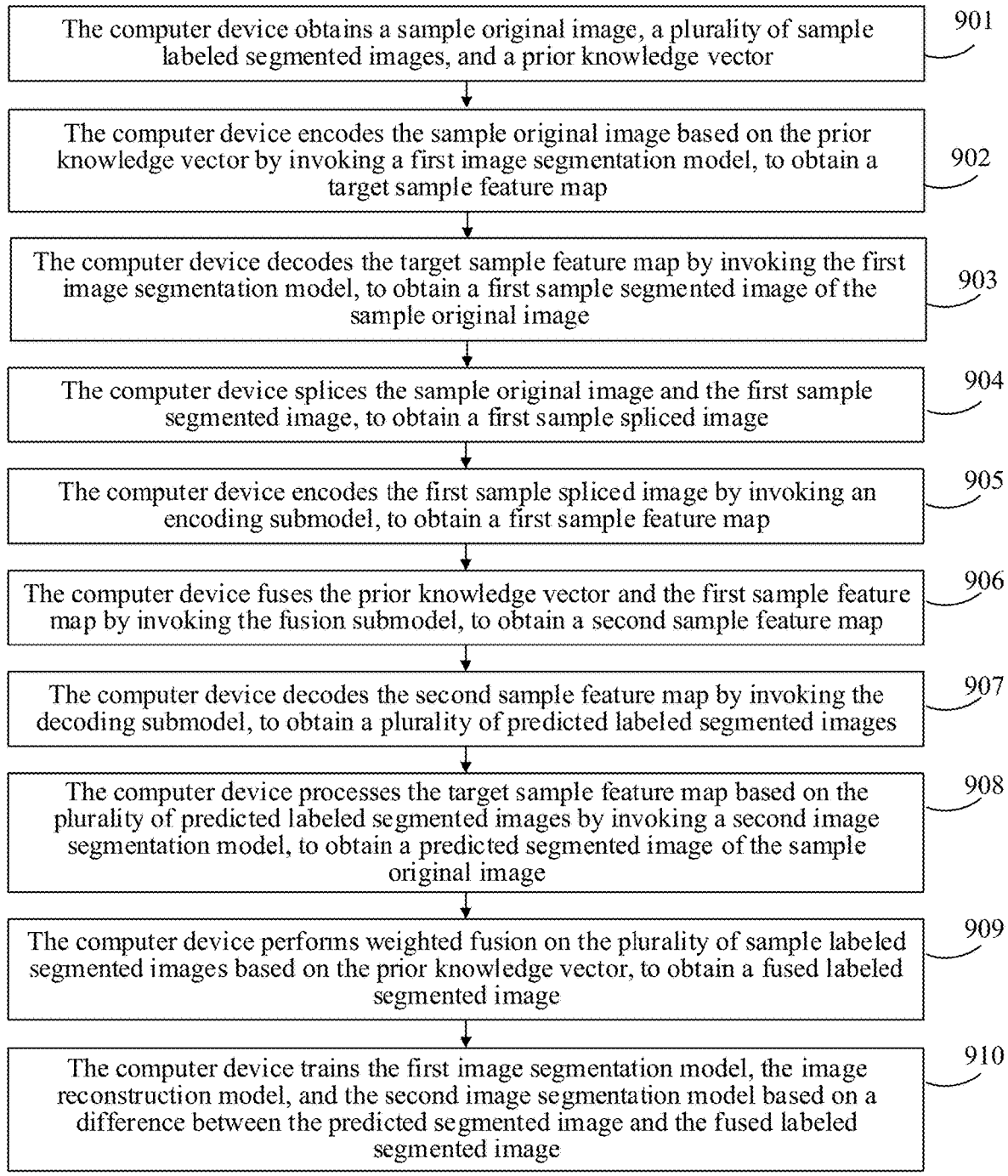
FIG. 9 is a flowchart of a model training method according to an embodiment of the present disclosure.

FIG. 9 is a flowchart of a model training method according to an embodiment of the present disclosure. The method is applied to a computer device. As shown in FIG. 9, the method includes the following steps.

901. The computer device obtains a sample original image, a plurality of sample labeled segmented images, and a prior knowledge vector.

The sample original image includes a sample object, each of the sample labeled segmented images corresponds to one prior knowledge weight, each of the sample labeled segmented images indicates a sample region in which the sample object is located in the sample original image, each of the sample labeled segmented images is obtained by a corresponding rater labeling the sample original image, and each of the sample labeled segmented images is a real labeling result of the corresponding rater. For example, in the medical field, the sample original image is an eye image, and the plurality of raters are a plurality of eye doctors.

902. The computer device encodes the sample original image based on the prior knowledge vector by invoking a first image segmentation model, to obtain a target sample feature map.

This step is similar to the foregoing step 301 to step 303. Details are not described wherein again.

903. The computer device decodes the target sample feature map by invoking the first image segmentation model, to obtain a first sample segmented image of the sample original image.

The first sample segmented image indicates a sample region in which the sample object is located in the sample original image.

This step is similar to the foregoing step 304. Details are not described herein again.

904. The computer device concatenates the sample original image and the first sample segmented image, to obtain a first sample concatenated image.

This step is similar to the foregoing step 305. Details are not described herein again.

905. The computer device encodes the first sample concatenated image by invoking an encoding submodel, to obtain a first sample feature map.

In this embodiment of the present disclosure, an image reconstruction model includes the encoding submodel, a fusion submodel, and a decoding submodel. This step is similar to the foregoing step 306. Details are not described herein again.

906. The computer device fuses the prior knowledge vector and the first sample feature map by invoking the fusion submodel, to obtain a second sample feature map.

This step is similar to the foregoing step 307. Details are not described herein again.

907. The computer device decodes the second sample feature map by invoking the decoding submodel, to obtain a plurality of predicted labeled segmented images.

Each of the predicted labeled segmented images corresponds to one prior knowledge weight, and each of the predicted labeled segmented images indicates a sample region labeled by a corresponding rater.

This step is similar to the foregoing step 308. Details are not described herein again.

In this embodiment of the present disclosure, after the sample original image and the first sample segmented image are concatenated, the encoding submodel, the fusion submodel, and the decoding submodel in the image reconstruction model are invoked to obtain the plurality of predicted labeled segmented images. In another embodiment, there is no need to perform the foregoing step 904 to step 907, and by using another manner, the image reconstruction model is invoked to perform image reconstruction on the first sample segmented image according to the prior knowledge vector, to obtain the plurality of predicted labeled segmented images.

908. The computer device processes the target sample feature map based on the plurality of predicted labeled segmented images by invoking a second image segmentation model, to obtain a predicted segmented image of the sample original image.

Figure 10:
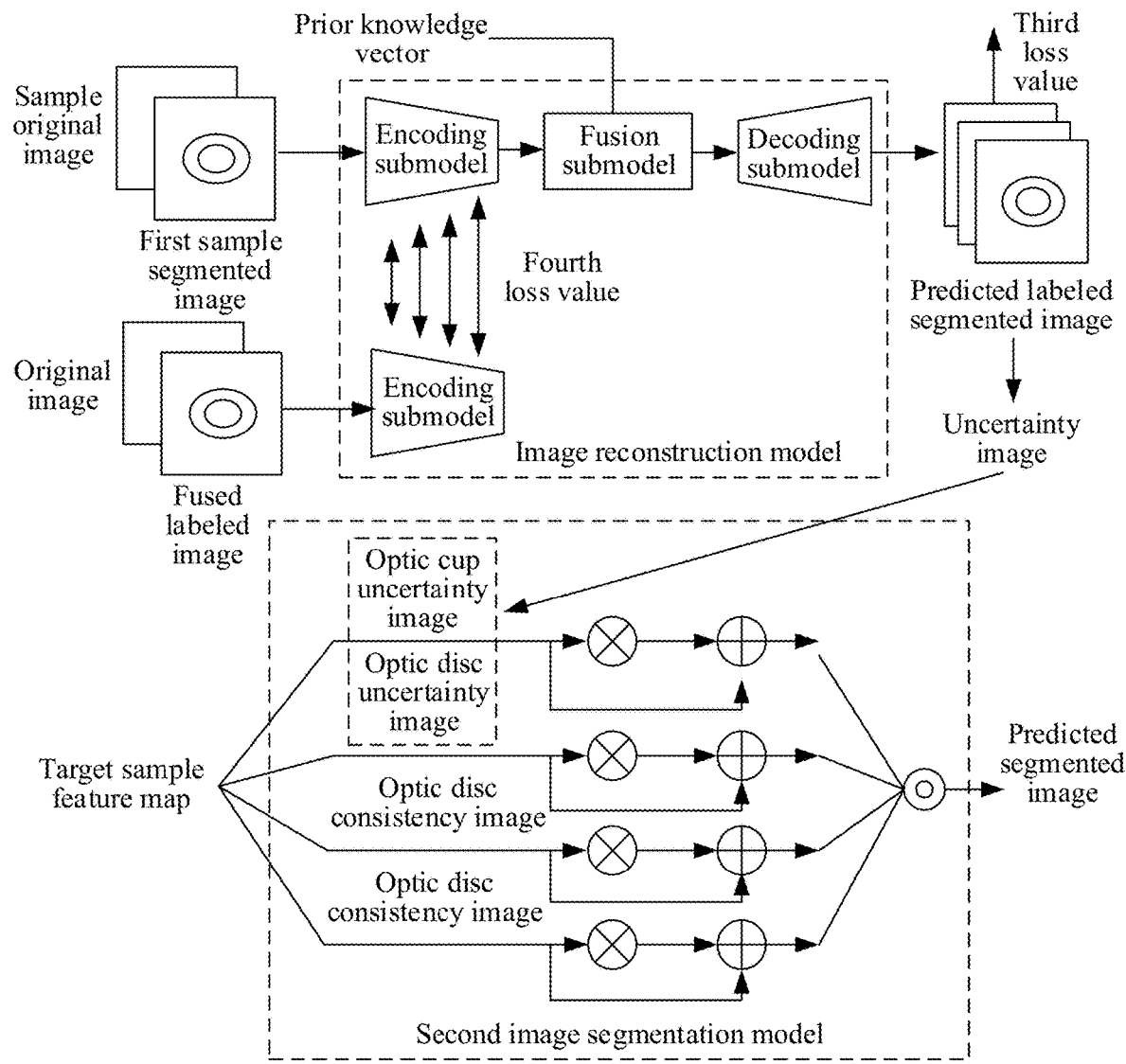
FIG. 10 is a flowchart of obtaining a predicted segmented image according to an embodiment of the present disclosure.

This step is similar to the foregoing step 309 to step 310. Details are not described herein again. As shown in FIG. 10, by using the sample original image being an eye image as an example, predicted labeled segmented images are obtained by the image reconstruction model, the predicted labeled segmented images include optic cup predicted labeled segmented images and optic disc predicted labeled segmented images, and obtained uncertainty images include an optic cup uncertainty image and an optic disc uncertainty image. An average value image of the plurality of optic cup predicted labeled segmented images is determined as an optic cup consistency image, and an average value image of the plurality of optic disc predicted labeled segmented images is determined as an optic disc consistency image. Then, the target sample feature map is respectively fused with the optic cup uncertainty image, the optic disc uncertainty image, the optic cup consistency image, and the optic disc consistency image by the second image segmentation model. A plurality of fused feature maps are concatenated, and convolution is performed on a concatenated feature map, to obtain the predicted segmented image.

909. The computer device performs weighted fusion on the plurality of sample labeled segmented images based on the prior knowledge vector, to obtain a fused labeled segmented image.

Because the prior knowledge vector includes a plurality of prior knowledge weights and the plurality of prior knowledge weights correspond to the plurality of sample labeled segmented images one by one, weighted fusion is performed on the plurality of sample labeled segmented images through the plurality of prior knowledge weights in the prior knowledge vector, and the obtained fused labeled segmented image is used as a final result labeled by the plurality of raters, so that the fused labeled segmented image is subsequently used as a supervised value, to train the first image segmentation model, the image reconstruction model, and the second image segmentation model.

In one embodiment, the plurality of prior knowledge weights, the plurality of sample labeled segmented images, and the fused labeled segmented image meet the following relationships:

$$GT^{soft} = \sum_{i^1=1}^{N^1} S_{i^1} V_{i^1}, \text{ and } \sum_{i^1=1}^{N^1} V_{i^1} = 1$$

where, $GT^{soft}$ represents the fused labeled segmented image; $N^1$ represents a total number of the plurality of prior knowledge weights, and $N^1$ is a positive integer greater than or equal to 2; $i^1$ is used for representing sequence numbers of a prior knowledge weight and a sample labeled segmented image, and $i^1$ is a positive integer greater than or equal to 1 and less than or equal to $N^1$; $S_{i^1}$ represents an $i^1_{th}$ sample labeled segmented image; and $V_{i^1}$ represents an $i^1_{th}$ prior knowledge weight, and the $i^1_{th}$ sample labeled segmented image $S_{i^1}$ corresponds to the $i^1_{th}$ prior knowledge weight $V_{i^1}$.

In one embodiment, if each of the sample labeled segmented images includes weights corresponding to a plurality of pixel points in the original image, step 909 includes: performing weighted fusion on pixel values of pixel points located at same positions in the plurality of sample labeled segmented images based on the prior knowledge vector, to obtain a fused weight corresponding to each of the positions; and forming the fused labeled segmented image by the fused weights corresponding to the plurality of positions. For a pixel point located at any position in any sample labeled segmented image, a pixel value of the pixel point is a weight corresponding to a pixel point located at a same position in the original image.

910. The computer device trains the first image segmentation model, the image reconstruction model, and the second image segmentation model based on a difference between the predicted segmented image and the fused labeled segmented image.

The fused labeled segmented image is equivalent to a real labeled segmented image of the sample original image, that is, the fused labeled segmented image indicates the sample region in which the sample object is located in the sample original image, the sample region is a region in which the sample object is located in the sample original image, and the predicted segmented image is predicted by the first image segmentation model, the image reconstruction model, and the second image segmentation model. Therefore, the inaccuracy of the first image segmentation model, the image reconstruction model, and the second image segmentation model can be determined based on the difference between the predicted segmented image and the fused labeled segmented image, so that the first image segmentation model, the image reconstruction model, and the second image segmentation model are adjusted subsequently.

In one embodiment, step 910 includes the following step 9101 to step 9102.

9101. Determine a first loss value based on the difference between the predicted segmented image and the fused labeled segmented image.

The first loss value is used for representing the difference between the predicted segmented image and the fused labeled segmented image. A larger loss value represents lower accuracy of the first image segmentation model, the image reconstruction model, and the second image segmentation model. A smaller loss value represents higher accuracy of the first image segmentation model, the image reconstruction model, and the second image segmentation model.

9102. Train the first image segmentation model, the image reconstruction model, and the second image segmentation model based on the first loss value.

Figure 11:
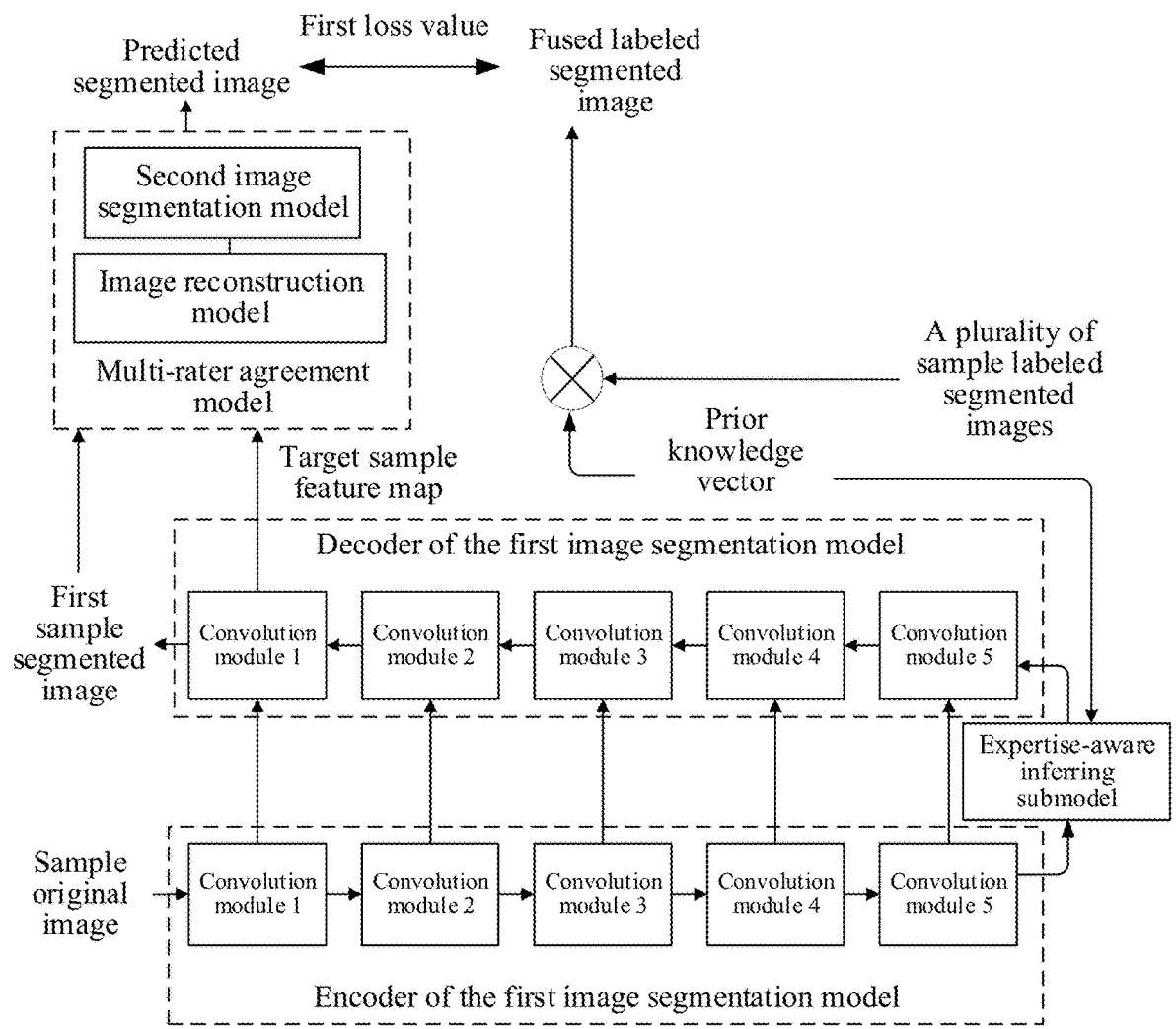
FIG. 11 is a flowchart of a process of training a model according to an embodiment of the present disclosure.

The first image segmentation model, the image reconstruction model, and the second image segmentation model are trained through the first loss value, to reduce the first loss value, and improve the accuracy of the first image segmentation model, the image reconstruction model, and the second image segmentation model. As shown in FIG. 11, the predicted segmented image is obtained by the first image segmentation model, the image reconstruction model, and the second image segmentation model, where a expertise-aware inferring submodel is a submodel in the first image segmentation model. After weighted fusion is performed on the plurality of sample labeled segmented images to obtain the fused labeled segmented image, the first loss value is determined based on the difference between the predicted segmented image and the fused labeled segmented image, and the first image segmentation model, the image reconstruction model, and the second image segmentation model are trained based on the determined first loss value.

In one embodiment, step 9102 includes the following three manners.

First manner: Determine a second loss value based on a difference between the first sample segmented image and the fused labeled segmented image, and train the first image segmentation model, the image reconstruction model, and the second image segmentation model based on the first loss value and the second loss value.

The second loss value is used for representing the difference between the first sample segmented image and the fused labeled segmented image. A greater difference between the first sample segmented image and the fused labeled segmented image indicates a larger second loss value. A less difference between the first sample segmented image and the fused labeled segmented image indicates a smaller second loss value.

The first image segmentation model, the image reconstruction model, and the second image segmentation model are trained through the first loss value and the second loss value, to reduce the first loss value and the second loss value, and improve the accuracy of the first image segmentation model, the image reconstruction model, and the second image segmentation model.

In one embodiment, the process of training the first image segmentation model, the image reconstruction model, and the second image segmentation model based on the first loss value and the second loss value includes: determining a first sum value of the first loss value and the second loss value; and training the first image segmentation model, the image reconstruction model, and the second image segmentation model based on the first sum value.

Second manner: Determine a third loss value based on differences between the plurality of predicted labeled segmented images and the corresponding sample labeled segmented images, and train the first image segmentation model, the image reconstruction model, and the second image segmentation model based on the first loss value and the third loss value.

The third loss value is a reconstruction loss, and is used for representing the differences between the plurality of predicted labeled segmented images and the corresponding sample labeled segmented images.

In one embodiment, the plurality of predicted labeled segmented images, the plurality of sample labeled segmented images, and the third loss value meet the following relationships:

$$\text{loss}_{rec} = \frac{1}{N^1} \sum_{i^2=1}^{N^1} L_{BCE}(S_{i^2}, \overline{S}_{i^2})$$

$$L_{BCE}(S_{i^2}, \overline{S}_{i^2}) = S_{i^2} \log(\overline{S}_{i^2}) + (1 - S_{i^2}) \log(1 - \overline{S}_{i^2})$$

where, $\text{loss}_{rec}$ represents the third loss value; $N^1$ represents a total number of the plurality of prior knowledge weights, namely, a number of the plurality of predicted labeled segmented images, and $N^1$ is a positive integer greater than or equal to 2; $i^2$ represents sequence numbers of a predicted labeled segmented image and a sample labeled segmented image; $L_{BCE}$ is a binary cross-entropy loss function; $S_{i^2}$ represents an $i^2_{th}$ sample labeled segmented image; and $\overline{S}_{i^2}$ represents an $i^2_{th}$ predicted labeled segmented image.

In one embodiment, the process of training the first image segmentation model, the image reconstruction model, and the second image segmentation model based on the first loss value and the third loss value includes: determining a second sum value of the first loss value and the third loss value; and training the first image segmentation model, the image reconstruction model, and the second image segmentation model according to the second sum value.

Third manner: Concatenate the sample original image and the fused labeled segmented image, to obtain a second sample concatenated image; encode the second sample concatenated image by invoking the encoding submodel, to obtain a third sample feature map; determine a fourth loss value based on a difference between the third sample feature map and the first sample feature map; and train the first image segmentation model, the image reconstruction model, and the second image segmentation model based on the first loss value and the fourth loss value.

The fourth loss value is a consistency loss, and is used for representing the difference between the third sample feature map and the first sample feature map. A process of obtaining the second sample concatenated image is similar to the foregoing step 305. Details are not described herein again. A process of obtaining the third sample feature map by invoking the encoding submodel is similar to the foregoing step 905. Details are not described herein again.

The first sample feature map is obtained by invoking the encoding submodel to encode the first sample concatenated image, the first sample concatenated image is obtained by concatenating the sample original image and the first sample segmented image, the third sample feature map is obtained by invoking the encoding submodel to encode the second sample concatenated image, the second sample concatenated image is obtained by concatenating the sample original image and the fused labeled segmented image, the first sample segmented image is predicted, and the fused labeled segmented image is the real result labeled by the plurality of raters. Therefore, through the fourth loss value, a difference between the first sample feature map corresponding to a predicted result outputted by the same encoding submodel and the third sample feature map corresponding to the real result can be determined, and a difference between the predicted result and the real result can be reflected, thereby reflecting the accuracy of the encoding submodel.

In one embodiment, the process of training the first image segmentation model, the image reconstruction model, and the second image segmentation model based on the first loss value and the fourth loss value includes: determining a third sum value of the first loss value and the fourth loss value; and training the first image segmentation model, the image reconstruction model, and the second image segmentation model based on the third sum value.

In one embodiment, the encoding submodel includes a plurality of third convolution modules. In a process of encoding the first sample concatenated image by invoking the plurality of third convolution modules, a first third convolution module is invoked to encode the first sample concatenated image, to obtain a first third reference feature map; a current third convolution module is invoked to encode a third reference feature map outputted by a previous third convolution module, to obtain a third reference feature map corresponding to the current third convolution module, until a third reference feature map outputted by a last third convolution module is obtained; and the third reference feature map outputted by the last third convolution module is determined as the first sample feature map. Similarly, in a process of invoking the plurality of third convolution modules to encode the second sample concatenated image, a plurality of fourth reference feature maps corresponding to the second sample concatenated image can also be obtained according to the foregoing manner, and a fourth reference feature map outputted by the last third convolution module is determined as the second sample concatenated image.

Therefore, the fourth loss value meets the following relationship:

$$\text{loss}_{con} = \frac{1}{Q}\sum_{i^3=1}^{Q}\frac{1}{2}\|D_{i^3} - \overline{D}_{i^3}\|^2$$

where, $\text{loss}_{con}$ represents the fourth loss value; Q represents a number of the plurality of third convolution modules included in the encoding submodel, and Q is a positive integer greater than or equal to 2; $i^3$ represents a sequence number of a third convolution module, and $i^3$ is a positive integer greater than or equal to 1 and less than or equal to Q; $D_{i^3}$ represents a third reference feature map outputted by an $i^3_{th}$ third convolution module; and $\overline{D}_{i^3}$ represents a fourth reference feature map outputted by the $i^3_{th}$ third convolution module.

The above only describes the training of the first image segmentation model, the image reconstruction model, and the second image segmentation model in three manners. In another embodiment, the above three manners can be combined in pairs, for example, the first manner is combined with the second manner; the second manner is combined with the third manner; or, the three manners are combined.

In one embodiment, step 9102 includes: determining a second loss value based on a difference between the first sample segmented image and the fused labeled segmented image; determining a third loss value based on differences between the plurality of predicted labeled segmented images and the corresponding sample labeled segmented images; concatenating the sample original image and the fused labeled segmented image, to obtain a second sample concatenated image; encoding the second sample concatenated image by invoking the encoding submodel, to obtain a third sample feature map; determining a fourth loss value based on a difference between the third sample feature map and the first sample feature map; and training the first image segmentation model, the image reconstruction model, and the second image segmentation model based on the first loss value, the second loss value, the third loss value, and the fourth loss value.

In some embodiments, the process of training the first image segmentation model, the image reconstruction model, and the second image segmentation model based on the first loss value, the second loss value, the third loss value, and the fourth loss value includes: determining a total loss value based on the first loss value, the second loss value, the third loss value, and the fourth loss value; and training the first image segmentation model, the image reconstruction model, and the second image segmentation model based on the total loss value.

In some embodiments, the first loss value, the second loss value, the third loss value, the fourth loss value, and the total loss value meet the following relationship:

$$L = L_{BCE}(P^1, GT^{soft}) + L_{BCE}(M, GT^{soft}) + \alpha \text{loss}_{con} + (1-\alpha)\text{loss}_{rec}$$

where, L represents the total loss value; $L_{BCE}$ is a binary cross-entropy loss function; $P^1$ represents the second loss value; $GT^{soft}$ represents the fused labeled segmented image; M represents the predicted segmented image; α represents a super-parameter, is used for balancing the third loss value and the second loss value, and can be set to 0.7; $\text{loss}_{rec}$ represents the third loss value; and $\text{loss}_{con}$ represents the fourth loss value.

According to the model training manner provided in this embodiment of the present disclosure, in a process of segmenting an original image, prior knowledge weights used for representing labeling accuracy of a plurality of raters are introduced, and labeled segmented images matching the plurality of raters are reconstructed to indicate a target region in which a target object is located in the original image, that is, a plurality of labeling results of the plurality of raters for the original image are reconstructed; and then a second segmented image of the original image is obtained through the plurality of labeled segmented images and a target feature map of the original image, so that the labeling results corresponding to the plurality of raters are fused into the second segmented image, thereby ensuring the accuracy of the second segmented image, and then improving the accuracy of image segmentation.

In addition, differences between a plurality of reconstructed predicted labeled segmented images and a plurality of sample labeled segmented images, a difference between a third sample feature map and a first sample feature map, and a difference between a first sample segmented image and a fused labeled segmented image are considered, to improve the accuracy of a first image segmentation model, an image reconstruction model, and a second image segmentation model.

The model training method provided in this embodiment of the present disclosure trains a model based on sample labeled segmented images corresponding to a plurality of raters. In a process of training a model in the existing technologies, the model can be trained by using a sample labeled segmented image of a single rater. Table 1 includes the accuracy of models after training various models by using sample labeled segmented images labeled by different raters. As shown in Table 1, it can be seen from the accuracy in Table 1 that, models after model training by using the sample labeled segmented images of the plurality of raters have high accuracy.

In addition, through the provided image reconstruction model, the labeled segmented images of the plurality of raters can be reconstructed, the correlation between obtained predicted segmented images and the sample labeled segmented images can be enhanced, and the uncertainty among the raters can be estimated.

TABLE 1

|  | Rater 1 | Rater 2 | Rater 3 | Rater 4 | Rater 5 | Rater 6 | A plurality of raters |
|---|---|---|---|---|---|---|---|
| Model 1 | 0.852 | 0.823 | 0.815 | 0.832 | 0.795 | 0.755 | 0.866 |
| Model 2 | 0.834 | 0.836 | 0.785 | 0.823 | 0.784 | 0.764 | 0.854 |
| Model 3 | 0.829 | 0.800 | 0.833 | 0.786 | 0.813 | 0.765 | 0.851 |
| Model 4 | 0.798 | 0.809 | 0.770 | 0.875 | 0.725 | 0.691 | 0.818 |
| Model 5 | 0.803 | 0.775 | 0.790 | 0.731 | 0.817 | 0.774 | 0.817 |
| Model 6 | 0.790 | 0.764 | 0.763 | 0.704 | 0.799 | 0.803 | 0.797 |

The method provided in the embodiments of the present disclosure can perform image segmentation on the original image by the first image segmentation model, the image reconstruction model, and the second image segmentation model. By using medical images as examples in Table 2 and Table 3, the accuracy of performing image segmentation on the medical images is compared by using the model provided in the present disclosure and image segmentation models provided in the existing technologies. By using an eye image as an example in Table 2, image segmentation is performed on the eye image, to determine a segmented image corresponding to an optic cup in the eyes and a segmented image corresponding to an optic disc in the eyes. It can be seen from data in Table 2 that, the accuracy of the model provided by the embodiments of the present disclosure is the highest whether the segmented image corresponding to the optic cup or the segmented image corresponding to the optic disc is obtained. By using a kidney image, a brain image, a tumor image, and the like in the medical images as an example in Table 3, it can be seen from data in Table 3 that, the accuracy of the model provided in the embodiments of the present disclosure is the highest no matter whether a segmented image of any medical image is obtained. That is, the segmented image obtained by the image segmentation method provided in the present disclosure has high accuracy and has a good image segmentation effect.

TABLE 2

|  | Optic cup-accuracy | Optic disc-accuracy | Optic cup-correction value | Optic disc-correction value |
| --- | --- | --- | --- | --- |
| Model 1 | 96.31 | 72.05 | 92.93 | 59.44 |
| Model 2 | 96.55 | 81.82 | 93.38 | 71.03 |
| Model 3 | 96.75 | 85.38 | 93.75 | 75.76 |
| Model 4 | 95.85 | 84.07 | 92.12 | 74.40 |
| Model 5 | 97.08 | 85.97 | 94.38 | 77.18 |
| The model provided in the present disclosure | 97.55 | 87.20 | 95.24 | 78.62 |

TABLE 3

|  | Kidney-accuracy | Brain-accuracy | Tumor-accuracy | Accuracy of another image | Accuracy of another image |
| --- | --- | --- | --- | --- | --- |
| Model 1 | 70.03 | 80.99 | 83.12 | 84.55 | 67.81 |
| Model 2 | 72.93 | 82.91 | 86.17 | 86.40 | 70.95 |
| Model 3 | — | — | — | 85.98 | 72.87 |
| Model 4 | 70.65 | 81.77 | 84.03 | 85.18 | 68.39 |
| Model 5 | 72.31 | 82.79 | 85.85 | 86.23 | 69.05 |
| Model 6 | 73.44 | 83.54 | 86.74 | 87.03 | 75.61 |
| The model provided in the present disclosure | 74.97 | 84.31 | 88.40 | 87.27 | 76.01 |

Based on the image segmentation method provided in the present disclosure, under conditions of different prior knowledge weights, the accuracy of different models is compared, as shown in FIG. 4. Model 1 to Model 6 are models respectively obtained by training by using labeled segmented images of rater 1 to rater 6. A plurality of models are evaluated by using different prior knowledge vectors, where the plurality of different prior knowledge vectors include prior knowledge weights and average prior knowledge weights of single raters and random raters. As shown in Table 4, for a prior knowledge vector of a single rater, a prior knowledge vector of a selected rater is 1, and prior knowledge vectors of other raters are 0. By using the eye image as an example, the eye image is segmented by a plurality of models to obtain segmented images of the eye image. The accuracy of a segmented image of the optic cup and the accuracy of a segmented image of the optic disc obtained by each of the models are shown in Table 4. It can be seen from Table 4 that, the image segmentation method provided in the present disclosure always achieves superior performance under the conditions of different prior knowledge vectors.

TABLE 4

|  | Rater 1 | Rater 2 | Rater 3 | Rater 4 | Rater 5 | Rater 6 | Random | Average |
| --- | --- | --- | --- | --- | --- | --- | --- | --- |
| Prior knowledge vector | [1, 0, 0, 0, 0, 0] | [0, 1, 0, 0, 0, 0] | [0, 0, 1, 0, 0, 0] | [0, 0, 0, 1, 0, 0] | [0, 0, 0, 0, 1, 0] | [0, 0, 0, 0, 0, 1] | [—, —, —, —, —, —] | [1, 1, 1, 1, 1, 1] |
| Model 1 | (95.11, 78.96) | (93.88, 76.68) | (95.24, 77.52) | (95.15, 75.75) | (95.60, 77.83) | (95.55, 74.13) | (96.94, 82.16) | (97.10, 83.48) |
| Model 2 | (95.74, 78.82) | (95.48, 80.65) | (95.38, 77.12) | (95.12, 77.42) | (95.01, 78.00) | (95.27, 73.80) | (96.85, 82.41) | (96.77, 83.10) |
| Model 3 | (95.30, 77.02) | (94.63, 77.31) | (96.21, 82.49) | (94.73, 76.14) | (94.14, 76.40) | (95.09, 74.85) | (96.57, 81.24) | (96.66, 82.04) |
| Model 4 | (95.20, 76.47) | (94.38, 80.42) | (94.81, 76.69) | (96.58, 86.88) | (95.52, 72.31) | (95.39, 68.95) | (96.99, 77.45) | (97.01, 78.68) |
| Model 5 | (95.18, 78.37) | (94.82, 76.73) | (95.05, 78.13) | (95.18, 72.67) | (95.34, 80.53) | (95.97, 74.44) | (96.60, 79.13) | (96.68, 79.58) |
| Model 6 | (95.05, 77.72) | (94.64, 75.35) | (95.39, 75.10) | (95.16, 69.90) | (95.09, 78.31) | (96.34, 78.60) | (97.00, 79.42) | (96.99, 79.01) |
| The present disclosure | (95.35, 81.77) | (94.81, 81.18) | (95.80, 79.23) | (95.96, 84.46) | (95.90, 79.04) | (95.76, 76.20) | (97.28, 85.65) | (97.55, 87.20) |

Figure 12:
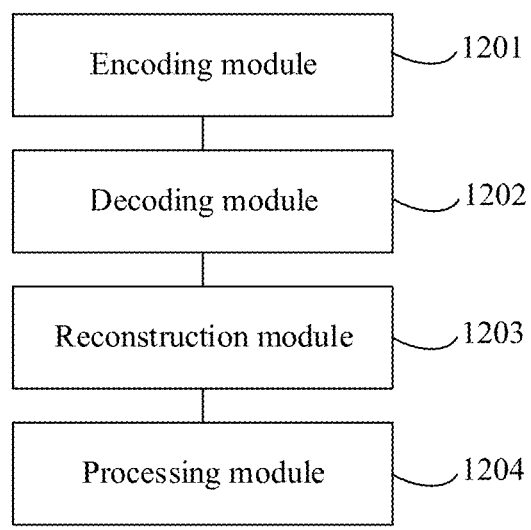
FIG. 12 is a schematic structural diagram of an image segmentation apparatus according to an embodiment of the present disclosure.

FIG. 12 is a schematic structural diagram of an image segmentation apparatus according to an embodiment of the present disclosure. Referring to FIG. 12, the apparatus includes:

an encoding module 1201, configured to encode an original image based on a prior knowledge vector, to obtain a target feature map, the original image including a target object, the prior knowledge vector including a plurality of prior knowledge weights, each of the prior knowledge weights being used for representing labeling accuracy, the labeling accuracy describes how accurate a person (hereinafter also referred to as a rater) labels a region of an object in an image;

a decoding module 1202, configured to decode the target feature map, to obtain a first segmented image of the original image, the first segmented image indicating a target region in which the target object is located in the original image;

a reconstruction module 1203, configured to perform image reconstruction on the first segmented image based on the prior knowledge vector, to obtain a plurality of labeled segmented images, each of the labeled segmented images corresponding to one prior knowledge weight, and each of the labeled segmented images indicating a target region labeled by a corresponding rater; and a processing module 1204, configured to process the target feature map based on the plurality of labeled segmented images, to obtain a second segmented image of the original image.

Figure 13:
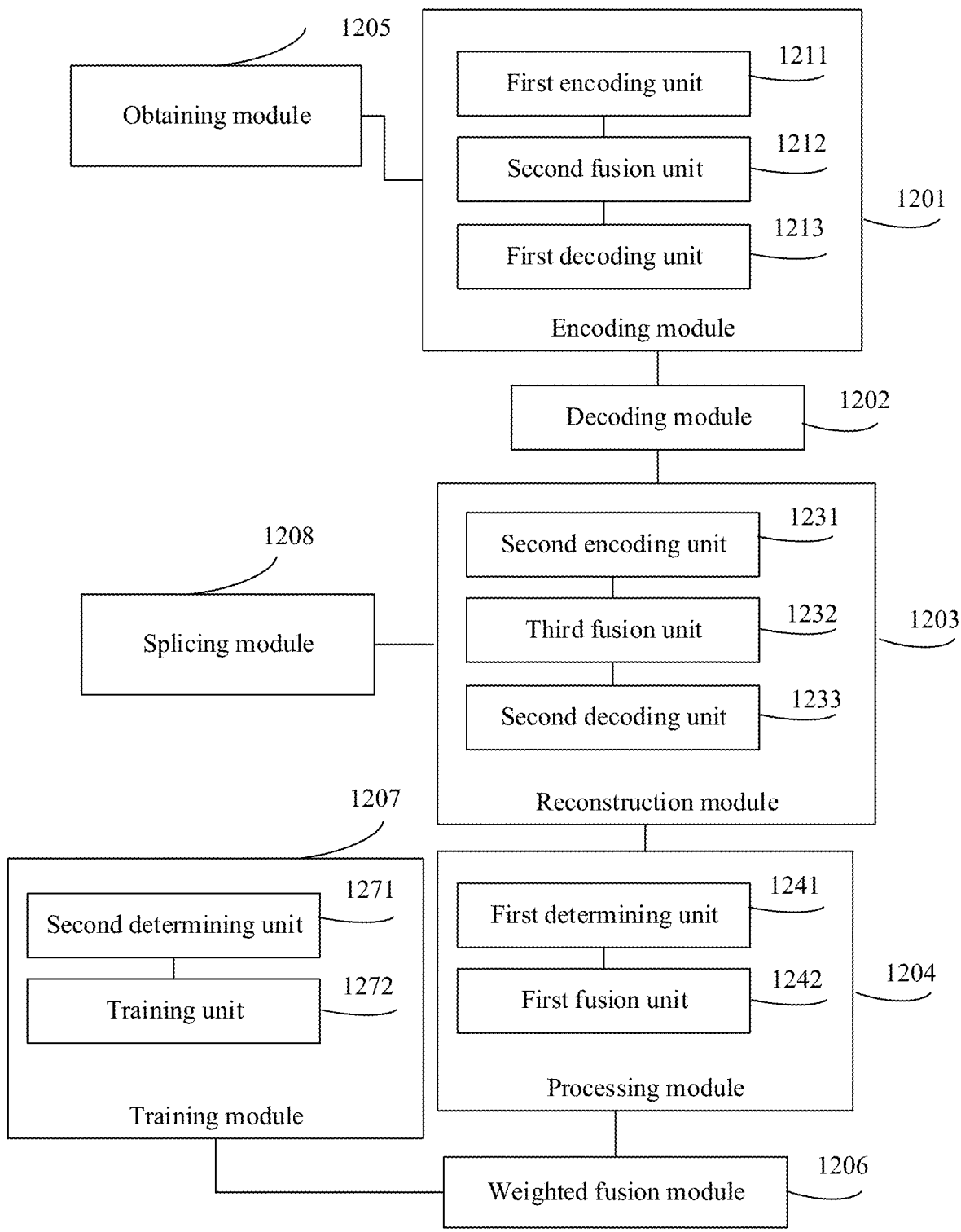
FIG. 13 is a schematic structural diagram of an image segmentation apparatus according to an embodiment of the present disclosure.

In one embodiment, as shown in FIG. 13, the processing module 1204 includes:

a first determining unit 1241, configured to determine an uncertainty image based on differences among the plurality of labeled segmented images, where the uncertainty image indicates differences among a plurality of target regions, and each of the target regions is a region indicated by the labeled segmented image; and a first fusion unit 1242, configured to fuse the target feature map and the uncertainty image, to obtain a second segmented image.

In another embodiment, each of the labeled segmented images includes first weights corresponding to a plurality of pixel points in the original image, where the first weights are used for representing possibilities of the corresponding pixel points in the target region; and the first determining unit 1241 is configured to determine a difference value image between each of the labeled segmented images and an average value image, where the average value image is an average value image of the plurality of labeled segmented images; determine a square sum of pixel values of pixel points located at each of same positions in the plurality of difference value images; respectively determine a square root of a ratio of the square sum corresponding to each position to a target number as a second weight of each position, where the target number is a number of the plurality of labeled segmented images; and construct the uncertainty image based on the second weights of the plurality of positions.

In another embodiment, the first fusion unit 1242 is configure to determine an average value image of the plurality of labeled segmented images; determine a product of the target feature map and the uncertainty image, and determine a sum of the determined product and the target feature map as a first fused feature map; determine a product of the target feature map and the average value image, and determine a sum of the determined product and the target feature map as a second fused feature map; concatenate the first fused feature map and the second fused feature map, to obtain a concatenated fused feature map; and perform convolution on the concatenated fused feature map, to obtain the second segmented image.

In another embodiment, as shown in FIG. 13, the encoding module 1201 includes:

a first encoding unit 1211, configured to encode the original image, to obtain a first feature map of the original image;

a second fusion unit 1212, configured to fuse the prior knowledge vector and the first feature map, to obtain a second feature map; and a first decoding unit 1213, configured to decode the second feature map, to obtain the target feature map.

In another embodiment, as shown in FIG. 13, the reconstruction module 1203 includes:

a concatenating unit, configured to concatenate the original image and the first segmented image, to obtain a concatenated image;

a second encoding unit 1231, configured to encode the concatenated image, to obtain a third feature map;

a third encoding unit 1232, configured to fuse the prior knowledge vector and the third feature map, to obtain a fourth feature map; and a second decoding unit 1233, configured to decode the fourth feature map, to obtain the plurality of labeled segmented images.

In another embodiment, the step of encoding an original image based on a prior knowledge vector, to obtain a target feature map is performed by a first image segmentation model;

the step of decoding the target feature map, to obtain a first segmented image of the original image is performed by the first image segmentation model;

the step of performing image reconstruction on the first segmented image based on the prior knowledge vector, to obtain a plurality of labeled segmented images is performed by an image reconstruction model; and the step of processing the target feature map based on the plurality of labeled segmented images, to obtain a second segmented image of the original image is performed by a second image segmentation model.

In another embodiment, as shown in FIG. 13, the apparatus further includes:

an obtaining module 1205, configured to obtain a sample original image, a plurality of sample labeled segmented images, and the prior knowledge vector, where the sample original image includes a sample object, each of the sample labeled segmented images corresponds to one prior knowledge weight, each of the sample labeled segmented images indicates a sample region in which the sample object is located in the sample original image, and each of the sample labeled segmented images is labeled by a corresponding rater;

the encoding module 1201, further configured to encode the sample original image based on the prior knowledge vector by invoking the first image segmentation model, to obtain a target sample feature map;

the decoding module 1202, further configured to decode the target sample feature map by invoking the first image segmentation model, to obtain a first sample segmented image of the sample original image, where the first sample segmented image indicates the sample region in which the sample object is located in the sample original image;

the reconstruction module 1203, further configured to perform image reconstruction on the first sample segmented image based on the prior knowledge vector by invoking the image reconstruction model, to obtain a plurality of predicted labeled segmented images, where each of the predicted labeled segmented images corresponds to one prior knowledge weight, and each of the predicted labeled segmented images indicates the predicted sample region;

the processing module 1204, further configured to process the target sample feature map based on the plurality of predicted labeled segmented images by invoking the second image segmentation model, to obtain a predicted segmented image of the sample original image;

a weighted fusion module 1206, configured to perform weighted fusion on the plurality of sample labeled segmented images based on the prior knowledge vector, to obtain a fused labeled segmented image; and a training module 1207, configured to train the first image segmentation model, the image reconstruction model, and the second image segmentation model based on a difference between the predicted segmented image and the fused labeled segmented image.

In another embodiment, as shown in FIG. 13, the training module 1207 includes:

a second determining unit 1271, configured to determine a first loss value based on the difference between the predicted segmented image and the fused labeled segmented image; and a training unit 1272, configured to train the first image segmentation model, the image reconstruction model, and the second image segmentation model based on the first loss value.

In another embodiment, the training unit 1272 is configured to determine a second loss value based on a difference between the first sample segmented image and the fused labeled segmented image; and train the first image segmentation model, the image reconstruction model, and the second image segmentation model based on the first loss value and the second loss value.

In another embodiment, the training unit 1272 is configured to determine a third loss value based on differences between the plurality of predicted labeled segmented images and the corresponding sample labeled segmented images; and train the first image segmentation model, the image reconstruction model, and the second image segmentation model based on the first loss value and the third loss value.

In another embodiment, the image reconstruction model includes an encoding submodel, a fusion submodel, and a decoding submodel; and the reconstruction module 1203 is configured to concatenate the sample original image and the first sample segmented image, to obtain a first sample concatenated image; encode the first sample concatenated image by invoking the encoding submodel, to obtain a first sample feature map; fuse the prior knowledge vector and the first sample feature map by invoking the fusion submodel, to obtain a second sample feature map; and decode the second sample feature map by invoking the decoding submodel, to obtain the plurality of predicted labeled segmented images.

In another embodiment, as shown in FIG. 13, the apparatus further includes:

a concatenating module 1208, configured to concatenate the sample original image and the fused labeled segmented image, to obtain a second sample concatenated image;

the reconstruction module 1203, further configured to encode the second sample concatenated image by invoking the encoding submodel, to obtain a third sample feature map; and the training unit 1272, configured to determine a fourth loss value based on a difference between the third sample feature map and the first sample feature map; and train the first image segmentation model, the image reconstruction model, and the second image segmentation model based on the first loss value and the fourth loss value.

The image segmentation apparatus provided in the foregoing embodiment is illustrated with an example of division of each functional module. In practical application, the function distribution may be implemented by different functional modules according to requirements, that is, an internal structure of the computer device is divided into different functional modules, to implement all or some of the functions described above. In addition, the image segmentation apparatus provided in the foregoing embodiment belongs to the same concept as the image segmentation method embodiments. For a specific implementation process, reference may be made to the method embodiments, and details are not described herein again.

The term module (and other similar terms such as submodule, unit, subunit, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

An embodiment of the present disclosure further provides a computer device. The computer device includes a processor and a memory, the memory storing at least one computer program, the at least one computer program being loaded and executed by the processor to implement the following steps:

encoding an original image based on a prior knowledge vector, to obtain a target feature map, the original image including a target object, the prior knowledge vector including a plurality of prior knowledge weights, each of the prior knowledge weights being used for representing labeling accuracy, the labeling accuracy describes how accurate a person (hereinafter also referred to as a rater) labels a region of an object in an image;

decoding the target feature map, to obtain a first segmented image of the original image, the first segmented image indicating a target region in which the target object is located in the original image;

performing image reconstruction on the first segmented image based on the prior knowledge vector, to obtain a plurality of labeled segmented images, each of the labeled segmented images corresponding to one prior knowledge weight, and each of the labeled segmented images indicating a target region labeled by a corresponding rater; and processing the target feature map based on the plurality of labeled segmented images, to obtain a second segmented image of the original image.

In one embodiment, the at least one computer program is loaded and executed by the processor to implement the following steps:

determining an uncertainty image based on differences among the plurality of labeled segmented images, where the uncertainty image indicates differences among a plurality of target regions, and each of the target regions is a region indicated by the labeled segmented image; and fusing the target feature map and the uncertainty image, to obtain a second segmented image.

In one embodiment, each of the labeled segmented images includes first weights corresponding to a plurality of pixel points in the original image, where the first weights are used for representing possibilities of the corresponding pixel points in the target region; and the at least one computer program is loaded and executed by the processor to implement the following steps:

determining a difference value image between each of the labeled segmented images and an average value image, where the average value image is an average value image of the plurality of labeled segmented images;

determining a square sum of pixel values of pixel points located at each of same positions in the plurality of difference value images;

respectively determining a square root of a ratio of the square sum corresponding to each position to a target number as a second weight of each position, where the target number is a number of the plurality of labeled segmented images; and constructing the uncertainty image based on the second weights of the plurality of positions.

In one embodiment, the at least one computer program is loaded and executed by the processor to implement the following steps:

determining an average value image of the plurality of labeled segmented images;

determining a product of the target feature map and the uncertainty image, and determining a sum of the determined product and the target feature map as a first fused feature map;

determining a product of the target feature map and the average value image, and determining a sum of the determined product and the target feature map as a second fused feature map;

concatenating the first fused feature map and the second fused feature map, to obtain a concatenated fused feature map; and performing convolution on the concatenated fused feature map, to obtain the second segmented image.

In one embodiment, the at least one computer program is loaded and executed by the processor to implement the following steps:

encoding the original image, to obtain a first feature map of the original image;

fusing the prior knowledge vector and the first feature map, to obtain the second feature map; and decoding the second feature map, to obtain the target feature map.

In one embodiment, the at least one computer program is loaded and executed by the processor to implement the following steps:

concatenating the original image and the first segmented image, to obtain a concatenated image;

encoding the concatenated image, to obtain a third feature map;

fusing the prior knowledge vector and the third feature map, to obtain a fourth feature map; and decoding the fourth feature map, to obtain the plurality of labeled segmented images.

In one embodiment, the step of encoding an original image based on a prior knowledge vector, to obtain a target feature map is performed by a first image segmentation model;

the step of decoding the target feature map, to obtain a first segmented image of the original image is performed by the first image segmentation model;

the step of performing image reconstruction on the first segmented image based on the prior knowledge vector, to obtain a plurality of labeled segmented images is performed by an image reconstruction model; and the step of processing the target feature map based on the plurality of labeled segmented images, to obtain a second segmented image of the original image is performed by a second image segmentation model.

In one embodiment, the at least one computer program is loaded and executed by the processor to implement the following steps:

obtaining a sample original image, a plurality of sample labeled segmented images, and the prior knowledge vector, where the sample original image includes a sample object, each of the sample labeled segmented images corresponds to one prior knowledge weight, each of the sample labeled segmented images indicates a sample region in which the sample object is located in the sample original image, and each of the sample labeled segmented images is labeled by a corresponding rater;

encoding the sample original image based on the prior knowledge vector by invoking the first image segmentation model, to obtain a target sample feature map;

decoding the target sample feature map by invoking the first image segmentation model, to obtain a first sample segmented image of the sample original image, where the first sample segmented image indicates the sample region in which the sample object is located in the sample original image;

performing image reconstruction on the first sample segmented image based on the prior knowledge vector by invoking the image reconstruction model, to obtain a plurality of predicted labeled segmented images, where each of the predicted labeled segmented images corresponds to one prior knowledge weight, and each of the predicted labeled segmented images indicates the predicted sample region;

processing the target sample feature map based on the plurality of predicted labeled segmented images by invoking the second image segmentation model, to obtain a predicted segmented image of the sample original image;

performing weighted fusion on the plurality of sample labeled segmented images based on the prior knowledge vector, to obtain a fused labeled segmented image; and training the first image segmentation model, the image reconstruction model, and the second image segmentation model based on a difference between the predicted segmented image and the fused labeled segmented image.

In one embodiment, the at least one computer program is loaded and executed by the processor to implement the following steps:

determining a first loss value based on the difference between the predicted segmented image and the fused labeled segmented image; and training the first image segmentation model, the image reconstruction model, and the second image segmentation model based on the first loss value.

In one embodiment, the at least one computer program is loaded and executed by the processor to implement the following steps:

determining a second loss value based on a difference between the first sample segmented image and the fused labeled segmented image; and training the first image segmentation model, the image reconstruction model, and the second image segmentation model based on the first loss value and the second loss value.

In one embodiment, the at least one computer program is loaded and executed by the processor to implement the following steps:

determining a third loss value based on differences between the plurality of predicted labeled segmented images and the corresponding sample labeled segmented images; and training the first image segmentation model, the image reconstruction model, and the second image segmentation model based on the first loss value and the third loss value.

In one embodiment, the image reconstruction model includes an encoding submodel, a fusion submodel, and a decoding submodel; and the at least one computer program is loaded and executed by the processor to implement the following steps:

concatenating the sample original image and the first sample segmented image, to obtain a first sample concatenated image;

encoding the first sample concatenated image by invoking the encoding submodel, to obtain a first sample feature map;

fusing the prior knowledge vector and the first sample feature map by invoking the fusion submodel, to obtain a second sample feature map; and decoding the second sample feature map by invoking the decoding submodel, to obtain the plurality of predicted labeled segmented images.

In one embodiment, the at least one computer program is loaded and executed by the processor to implement the following steps:

concatenating the sample original image and the fused labeled segmented image, to obtain a second sample concatenated image;

encoding the second sample concatenated image by invoking the encoding submodel, to obtain a third sample feature map;

determining a fourth loss value based on a difference between the third sample feature map and the first sample feature map; and training the first image segmentation model, the image reconstruction model, and the second image segmentation model based on the first loss value and the fourth loss value.

Figure 14:
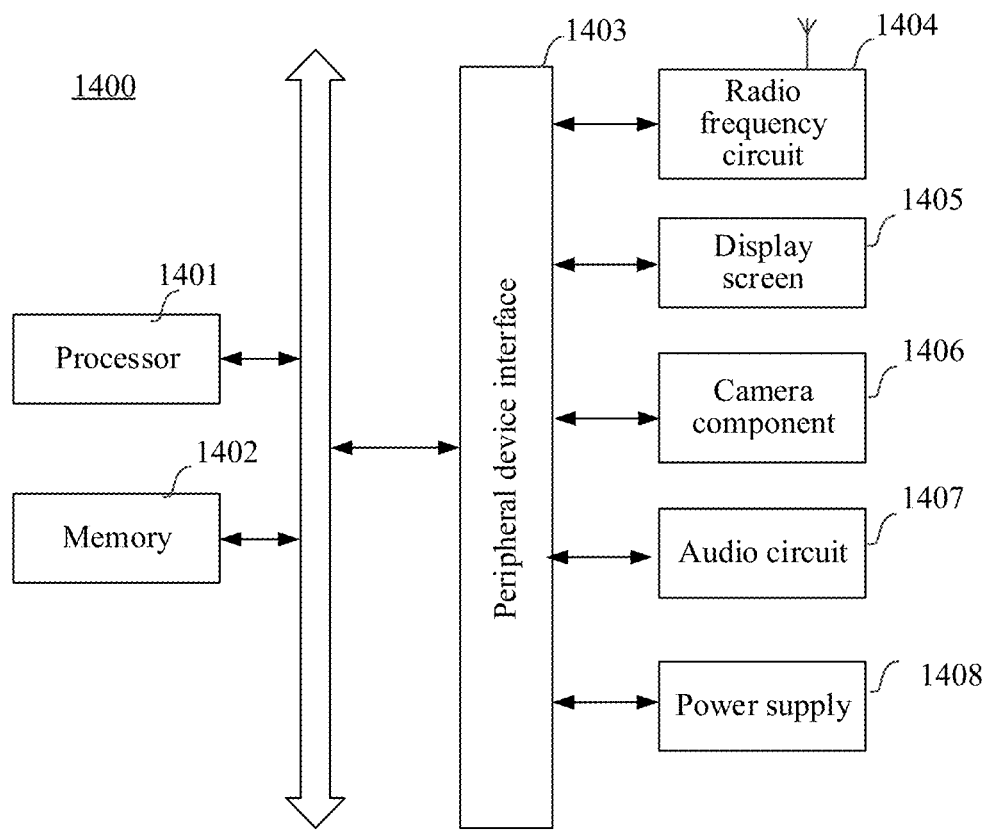
FIG. 14 is a schematic structural diagram of a terminal according to an embodiment of the present disclosure.

In some embodiments, the computer device is provided as a terminal. FIG. 14 is a structural block diagram of a terminal 1400 according to an exemplary embodiment of the present disclosure. The terminal 1400 includes a processor 1401 and a memory 1402.

The processor 1401 may include one or more processing cores, such as a 4-core processor or an 8-core processor. The processor 1401 further includes a main processor and a coprocessor. The main processor is configured to process data in an active state, also referred to as a central processing unit (CPU). The coprocessor is a low-power consumption processor configured to process data in a standby state. In some embodiments, the processor 1401 may be integrated with a graphics processing unit (GPU). The GPU is configured to render and draw content that needs to be displayed on a display. In some embodiments, the processor 1401 may further include an artificial intelligence (AI) processor. The AI processor is configured to process computing operations related to machine learning.

The memory 1402 may include one or more computer-readable storage media. The computer-readable storage media may be non-transitory. In some embodiments, a non-transitory computer-readable storage medium in the memory 1402 is configured to store at least one computer program, the at least one computer program being configured to be executed by the processor 1401 to implement the image segmentation method provided in the method embodiments of the present disclosure.

In some embodiments, the terminal 1400 may optionally include a peripheral device interface 1403 and at least one peripheral device. The processor 1401, the memory 1402, and the peripheral device interface 1403 may be connected by using a bus or a signal cable. Each peripheral device may be connected to the peripheral device interface 1403 by using a bus, a signal line, or a circuit board. Specifically, the peripheral device includes: at least one of a radio frequency (RF) circuit 1404, a display screen 1405, a camera component 1406, an audio circuit 1407, and a power supply 1408.

The peripheral device interface 1403 may be configured to connect at least one peripheral device related to input/output (I/O) to the processor 1401 and the memory 1402. In some embodiments, the processor 1401, the memory 1402, and the peripheral device interface 1403 are integrated on the same chip or the same circuit board. In some other embodiments, any or both of the processor 1401, the memory 1402, and the peripheral device interface 1403 may be implemented on an independent chip or circuit board, which is not limited in this embodiment.

The radio frequency circuit 1404 is configured to receive and transmit a radio frequency (RF) signal, which is also referred to as an electromagnetic signal. The radio frequency circuit 1404 communicates with a communication network and other communication devices through the electromagnetic signal. The RF circuit 1404 converts an electric signal into an electromagnetic signal for transmission, or converts a received electromagnetic signal into an electric signal.

The display screen 1405 is configured to display a user interface (UI). The UI may include a graph, a text, an icon, a video, and any combination thereof. When the display screen 1405 is a touch display screen, the display screen 1405 also has the ability to collect a touch signal at or above the surface of the display screen 1405. The touch signal may be inputted, as a control signal, to the processor 1401 for processing.

The camera assembly 1406 is configured to capture an image or a video. In some embodiments, the camera component 1406 includes a front-facing camera and a rear-facing camera.

The audio circuit 1407 may include a microphone and a speaker. The microphone is configured to collect sound waves from a user and an environment and convert the sound waves into electrical signals that are inputted to the processor 1401 for processing or to the radio frequency circuit 1404 for voice communication.

The power supply 1408 is configured to supply power to components in the terminal 1400. The power supply 1408 may be an alternating current, a direct current, a disposable battery, or a rechargeable battery.

A person skilled in the art may understand that the structure shown in FIG. 14 does not constitute a limitation to the terminal 1400, and the terminal may include more components or fewer components than those shown in the figure, or some components may be combined, or a different component deployment may be used.

Figure 15:
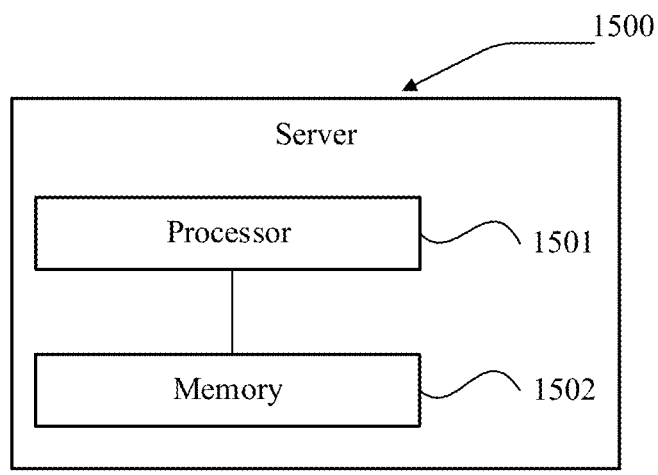
FIG. 15 is a schematic structural diagram of a server according to an embodiment of the present disclosure.

In some embodiments, the computer device is provided as a server. FIG. 15 is a schematic structural diagram of a server according to an embodiment of the present disclosure. The server 1500 may vary greatly due to different configurations or performance, and may include one or more central processing units (CPUs) 1501 and one or more memories 1502. The memory 1502 stores at least one computer program, the at least one computer program being loaded and executed by the processor 1501 to implement the methods provided in the foregoing method embodiments. Certainly, the server may further include components such as a wired or wireless network interface, a keyboard, and an input/output interface, to facilitate inputs/outputs. The server may further include another component configured to implement functions of a device. Details are not described herein again.

An embodiment of the present disclosure further provides a computer-readable storage medium. The computer-readable storage medium stores at least one computer program, the at least one computer program being loaded and executed by a processor to implement the following steps:

encoding an original image based on a prior knowledge vector, to obtain a target feature map, the original image including a target object, the prior knowledge vector including a plurality of prior knowledge weights, each of the prior knowledge weights being used for representing labeling accuracy, the labeling accuracy describes how accurate a person (hereinafter also referred to as a rater) labels a region of an object in an image;

decoding the target feature map, to obtain a first segmented image of the original image, the first segmented image indicating a target region in which the target object is located in the original image;

performing image reconstruction on the first segmented image based on the prior knowledge vector, to obtain a plurality of labeled segmented images, each of the labeled segmented images corresponding to one prior knowledge weight, and each of the labeled segmented images indicating a target region labeled by a corresponding rater; and processing the target feature map based on the plurality of labeled segmented images, to obtain a second segmented image of the original image.

In one embodiment, the at least one computer program is loaded and executed by the processor to implement the following steps:

determining an uncertainty image based on differences among the plurality of labeled segmented images, where the uncertainty image indicates differences among a plurality of target regions, and each of the target regions is a region indicated by the labeled segmented image; and fusing the target feature map and the uncertainty image, to obtain a second segmented image.

In one embodiment, each of the labeled segmented images includes first weights corresponding to a plurality of pixel points in the original image, where the first weights are used for representing possibilities of the corresponding pixel points in the target region; and the at least one computer program is loaded and executed by the processor to implement the following steps:

determining a difference value image between each of the labeled segmented images and an average value image, where the average value image is an average value image of the plurality of labeled segmented images;

determining a square sum of pixel values of pixel points located at each of same positions in the plurality of difference value images;

respectively determining a square root of a ratio of the square sum corresponding to each position to a target number as a second weight of each position, where the target number is a number of the plurality of labeled segmented images; and constructing the uncertainty image based on the second weights of the plurality of positions.

In one embodiment, the at least one computer program is loaded and executed by the processor to implement the following steps:

determining an average value image of the plurality of labeled segmented images;

determining a product of the target feature map and the uncertainty image, and determining a sum of the determined product and the target feature map as a first fused feature map;

determining a product of the target feature map and the average value image, and determining a sum of the determined product and the target feature map as a second fused feature map;

concatenating the first fused feature map and the second fused feature map, to obtain a concatenated fused feature map; and performing convolution on the concatenated fused feature map, to obtain the second segmented image.

In one embodiment, the at least one computer program is loaded and executed by the processor to implement the following steps:

encoding the original image, to obtain a first feature map of the original image;

fusing the prior knowledge vector and the first feature map, to obtain the second feature map; and decoding the second feature map, to obtain the target feature map.

In one embodiment, the at least one computer program is loaded and executed by the processor to implement the following steps:

concatenating the original image and the first segmented image, to obtain a concatenated image;

encoding the concatenated image, to obtain a third feature map;

fusing the prior knowledge vector and the third feature map, to obtain a fourth feature map; and decoding the fourth feature map, to obtain the plurality of labeled segmented images.

In one embodiment, the step of encoding an original image based on a prior knowledge vector, to obtain a target feature map is performed by a first image segmentation model;

the step of decoding the target feature map, to obtain a first segmented image of the original image is performed by the first image segmentation model;

the step of performing image reconstruction on the first segmented image based on the prior knowledge vector, to obtain a plurality of labeled segmented images is performed by an image reconstruction model; and the step of processing the target feature map based on the plurality of labeled segmented images, to obtain a second segmented image of the original image is performed by a second image segmentation model.

In one embodiment, the at least one computer program is loaded and executed by the processor to implement the following steps:

obtaining a sample original image, a plurality of sample labeled segmented images, and the prior knowledge vector, where the sample original image includes a sample object, each of the sample labeled segmented images corresponds to one prior knowledge weight, each of the sample labeled segmented images indicates a sample region in which the sample object is located in the sample original image, and each of the sample labeled segmented images is labeled by a corresponding rater;

encoding the sample original image based on the prior knowledge vector by invoking the first image segmentation model, to obtain a target sample feature map;

decoding the target sample feature map by invoking the first image segmentation model, to obtain a first sample segmented image of the sample original image, where the first sample segmented image indicates the sample region in which the sample object is located in the sample original image;

performing image reconstruction on the first sample segmented image based on the prior knowledge vector by invoking the image reconstruction model, to obtain a plurality of predicted labeled segmented images, where each of the predicted labeled segmented images corresponds to one prior knowledge weight, and each of the predicted labeled segmented images indicates the predicted sample region;

processing the target sample feature map based on the plurality of predicted labeled segmented images by invoking the second image segmentation model, to obtain a predicted segmented image of the sample original image;

performing weighted fusion on the plurality of sample labeled segmented images based on the prior knowledge vector, to obtain a fused labeled segmented image; and training the first image segmentation model, the image reconstruction model, and the second image segmentation model based on a difference between the predicted segmented image and the fused labeled segmented image.

In one embodiment, the at least one computer program is loaded and executed by the processor to implement the following steps:

determining a first loss value based on the difference between the predicted segmented image and the fused labeled segmented image; and training the first image segmentation model, the image reconstruction model, and the second image segmentation model based on the first loss value.

In one embodiment, the at least one computer program is loaded and executed by the processor to implement the following steps:

determining a second loss value based on a difference between the first sample segmented image and the fused labeled segmented image; and training the first image segmentation model, the image reconstruction model, and the second image segmentation model based on the first loss value and the second loss value.

In one embodiment, the at least one computer program is loaded and executed by the processor to implement the following steps:

determining a third loss value based on differences between the plurality of predicted labeled segmented images and the corresponding sample labeled segmented images; and training the first image segmentation model, the image reconstruction model, and the second image segmentation model based on the first loss value and the third loss value.

In one embodiment, the image reconstruction model includes an encoding submodel, a fusion submodel, and a decoding submodel; and the at least one computer program is loaded and executed by the processor to implement the following steps:

concatenating the sample original image and the first sample segmented image, to obtain a first sample concatenated image;

encoding the first sample concatenated image by invoking the encoding submodel, to obtain a first sample feature map;

fusing the prior knowledge vector and the first sample feature map by invoking the fusion submodel, to obtain a second sample feature map; and decoding the second sample feature map by invoking the decoding submodel, to obtain the plurality of predicted labeled segmented images.

In one embodiment, the at least one computer program is loaded and executed by the processor to implement the following steps:

concatenating the sample original image and the fused labeled segmented image, to obtain a second sample concatenated image;

encoding the second sample concatenated image by invoking the encoding submodel, to obtain a third sample feature map;

determining a fourth loss value based on a difference between the third sample feature map and the first sample feature map; and training the first image segmentation model, the image reconstruction model, and the second image segmentation model based on the first loss value and the fourth loss value.

An embodiment of the present disclosure further provides a computer program product or a computer program. The computer program product or the computer program stores computer program code, the computer program code being stored in a computer-readable storage medium. A processor of a computer device reads the computer program code from the computer-readable storage medium, and the processor executes the computer program code, to cause the computer device to implement the operations performed in the image segmentation method according to the foregoing embodiment.

Persons of ordinary skill in the art may understand that all or some of the steps of the foregoing embodiments may be implemented by using hardware, or may be implemented by a program instructing relevant hardware. The program may be stored in a computer-readable storage medium. The above-mentioned storage medium may be a read-only memory, a magnetic disk, an optical disc, or the like.

The foregoing descriptions are merely optional embodiments of the embodiments of the present disclosure, but are not intended to limit the embodiments of the present disclosure. Any modification, equivalent replacement, or improvement made without departing from the spirit and principle of the embodiments of the present disclosure is to fall within the protection scope of the present disclosure.

What is claimed is:

1. An image segmentation method, performed by a computer device, the method comprising:
    encoding an original image based on a prior knowledge vector, to obtain a target feature map, the original image comprising a target object, the prior knowledge vector comprising a plurality of prior knowledge weights, each of the prior knowledge weights representing accuracy of a corresponding rater labeling a region of an object in an image;
    decoding the target feature map, to obtain a first segmented image of the original image, the first segmented image indicating a target region in which the target object is located in the original image;
    performing image reconstruction on the first segmented image based on the prior knowledge vector, to obtain a plurality of labeled segmented images, wherein one labeled segmented image corresponds to one prior knowledge weight and indicates a target region labeled by a corresponding rater; and
    processing the target feature map based on the plurality of labeled segmented images, to obtain a second segmented image of the original image.

2. The method according to claim 1, wherein the processing the target feature map based on the plurality of labeled segmented images, to obtain a second segmented image of the original image comprises:
    determining an uncertainty image based on differences among the plurality of labeled segmented images, wherein the uncertainty image indicates differences among a plurality of target regions, and each of the target regions is a region indicated by one of the labeled segmented images; and
    fusing the target feature map and the uncertainty image, to obtain a second segmented image.

3. The method according to claim 2, wherein each of the labeled segmented images comprises first weights corresponding to a plurality of pixel points in the original image, wherein the first weights represent possibilities of the corresponding pixel points in the target region.

4. The method according to claim 3, wherein the determining an uncertainty image based on differences among the plurality of labeled segmented images comprises:
    determining a difference value image between each of the labeled segmented images and an average value image, wherein the average value image is an average value image of the plurality of labeled segmented images;
    determining a square sum of pixel values of pixel points located at each of same positions in the plurality of difference value images;
    respectively determining a square root of a ratio of the square sum corresponding to each position to a target number as a second weight of each position, wherein the target number is a number of the plurality of labeled segmented images; and
    constructing the uncertainty image based on the second weights of the plurality of positions.

5. The method according to claim 2, wherein the fusing the target feature map and the uncertainty image, to obtain a second segmented image comprises:
    determining an average value image of the plurality of labeled segmented images;
    determining a product of the target feature map and the uncertainty image, and determining a sum of the determined product and the target feature map as a first fused feature map;
    determining a product of the target feature map and the average value image, and determining a sum of the determined product and the target feature map as a second fused feature map;
    concatenating the first fused feature map and the second fused feature map, to obtain a concatenated fused feature map; and
    performing convolution on the concatenated fused feature map, to obtain the second segmented image.

6. The method according to claim 1, wherein the encoding an original image based on a prior knowledge vector, to obtain a target feature map comprises:
    encoding the original image, to obtain a first feature map of the original image;
    fusing the prior knowledge vector and the first feature map, to obtain a second feature map; and
    decoding the second feature map, to obtain the target feature map.

7. The method according to claim 1, wherein the performing image reconstruction on the first segmented image based on the prior knowledge vector, to obtain a plurality of labeled segmented images comprises:
    concatenating the original image and the first segmented image, to obtain a concatenated image;
    encoding the concatenated image, to obtain a third feature map;
    fusing the prior knowledge vector and the third feature map, to obtain a fourth feature map; and
    decoding the fourth feature map, to obtain the plurality of labeled segmented images.

8. The method according to claim 1, wherein
    the encoding an original image based on a prior knowledge vector, to obtain a target feature map is performed by a first image segmentation model;
    the decoding the target feature map, to obtain a first segmented image of the original image is performed by the first image segmentation model;
    the performing image reconstruction on the first segmented image based on the prior knowledge vector, to obtain a plurality of labeled segmented images is performed by an image reconstruction model; and
    the processing the target feature map based on the plurality of labeled segmented images, to obtain a second segmented image of the original image is performed by a second image segmentation model.

9. An image segmentation apparatus, comprising:
    a processor and a memory, the memory storing at least one computer program, the at least one computer program being loaded and executed by the processor to implement:

encoding an original image based on a prior knowledge vector, to obtain a target feature map, the original image comprising a target object, the prior knowledge vector comprising a plurality of prior knowledge weights, each of the prior knowledge weights representing accuracy of a corresponding rater labeling a region of an object in an image;

decoding the target feature map, to obtain a first segmented image of the original image, the first segmented image indicating a target region in which the target object is located in the original image;

performing image reconstruction on the first segmented image based on the prior knowledge vector, to obtain a plurality of labeled segmented images, wherein one labeled segmented image corresponds to one prior knowledge weight and indicates a target region labeled by a corresponding rater; and processing the target feature map based on the plurality of labeled segmented images, to obtain a second segmented image of the original image.

10. The apparatus according to claim 9, wherein the processing the target feature map based on the plurality of labeled segmented images, to obtain a second segmented image of the original image comprises:

determining an uncertainty image based on differences among the plurality of labeled segmented images, wherein the uncertainty image indicates differences among a plurality of target regions, and each of the target regions is a region indicated by one of the labeled segmented images; and fusing the target feature map and the uncertainty image, to obtain a second segmented image.

11. The apparatus according to claim 10, wherein each of the labeled segmented images comprises first weights corresponding to a plurality of pixel points in the original image, wherein the first weights represent possibilities of the corresponding pixel points in the target region; and the determining an uncertainty image based on differences among the plurality of labeled segmented images comprises:

determining a difference value image between each of the labeled segmented images and an average value image, wherein the average value image is an average value image of the plurality of labeled segmented images;

determining a square sum of pixel values of pixel points located at each of same positions in the plurality of difference value images;

respectively determining a square root of a ratio of the square sum corresponding to each position to a target number as a second weight of each position, wherein the target number is a number of the plurality of labeled segmented images; and constructing the uncertainty image based on the second weights of the plurality of positions.

12. The apparatus according to claim 10, wherein the fusing the target feature map and the uncertainty image, to obtain a second segmented image comprises:

determining an average value image of the plurality of labeled segmented images;

determining a product of the target feature map and the uncertainty image, and determining a sum of the determined product and the target feature map as a first fused feature map;

determining a product of the target feature map and the average value image, and determining a sum of the determined product and the target feature map as a second fused feature map;

concatenating the first fused feature map and the second fused feature map, to obtain a concatenated fused feature map; and performing convolution on the concatenated fused feature map, to obtain the second segmented image.

13. The apparatus according to claim 9, wherein the encoding an original image based on a prior knowledge vector, to obtain a target feature map comprises:

encoding the original image, to obtain a first feature map of the original image;

fusing the prior knowledge vector and the first feature map, to obtain a second feature map; and decoding the second feature map, to obtain the target feature map.

14. The apparatus according to claim 9, wherein the performing image reconstruction on the first segmented image based on the prior knowledge vector, to obtain a plurality of labeled segmented images comprises:

concatenating the original image and the first segmented image, to obtain a concatenated image;

encoding the concatenated image, to obtain a third feature map;

fusing the prior knowledge vector and the third feature map, to obtain a fourth feature map; and decoding the fourth feature map, to obtain the plurality of labeled segmented images.

15. The apparatus according to claim 9, wherein the encoding an original image based on a prior knowledge vector, to obtain a target feature map is performed by a first image segmentation model;

the decoding the target feature map, to obtain a first segmented image of the original image is performed by the first image segmentation model;

the performing image reconstruction on the first segmented image based on the prior knowledge vector, to obtain a plurality of labeled segmented images is performed by an image reconstruction model; and the processing the target feature map based on the plurality of labeled segmented images, to obtain a second segmented image of the original image is performed by a second image segmentation model.

16. A non-transitory computer-readable storage medium, storing at least one computer program, the at least one computer program being loaded and executed by a processor to implement:

encoding an original image based on a prior knowledge vector, to obtain a target feature map, the original image comprising a target object, the prior knowledge vector comprising a plurality of prior knowledge weights, each of the prior knowledge weights representing accuracy of a corresponding rater labeling a region of an object in an image;

decoding the target feature map, to obtain a first segmented image of the original image, the first segmented image indicating a target region in which the target object is located in the original image;

performing image reconstruction on the first segmented image based on the prior knowledge vector, to obtain a plurality of labeled segmented images, wherein one labeled segmented image corresponds to one prior knowledge weight and indicates a target region labeled by a corresponding rater; and processing the target feature map based on the plurality of labeled segmented images, to obtain a second segmented image of the original image.

17. The non-transitory computer-readable storage medium according to claim 16, wherein the processing the target feature map based on the plurality of labeled segmented images, to obtain a second segmented image of the original image comprises:

determining an uncertainty image based on differences among the plurality of labeled segmented images, wherein the uncertainty image indicates differences among a plurality of target regions, and each of the target regions is a region indicated by one of the labeled segmented images; and fusing the target feature map and the uncertainty image, to obtain a second segmented image.

18. The non-transitory computer-readable storage medium according to claim 17, wherein each of the labeled segmented images comprises first weights corresponding to a plurality of pixel points in the original image, wherein the first weights represent possibilities of the corresponding pixel points in the target region; and the determining an uncertainty image based on differences among the plurality of labeled segmented images comprises:

determining a difference value image between each of the labeled segmented images and an average value image, wherein the average value image is an average value image of the plurality of labeled segmented images;

determining a square sum of pixel values of pixel points located at each of same positions in the plurality of difference value images;

respectively determining a square root of a ratio of the square sum corresponding to each position to a target number as a second weight of each position, wherein the target number is a number of the plurality of labeled segmented images; and constructing the uncertainty image based on the second weights of the plurality of positions.

19. The non-transitory computer-readable storage medium according to claim 17, wherein the fusing the target feature map and the uncertainty image, to obtain a second segmented image comprises:

determining an average value image of the plurality of labeled segmented images;

determining a product of the target feature map and the uncertainty image, and determining a sum of the determined product and the target feature map as a first fused feature map;

determining a product of the target feature map and the average value image, and determining a sum of the determined product and the target feature map as a second fused feature map;

concatenating the first fused feature map and the second fused feature map, to obtain a concatenated fused feature map; and performing convolution on the concatenated fused feature map, to obtain the second segmented image.

20. The non-transitory computer-readable storage medium according to claim 17, wherein the encoding an original image based on a prior knowledge vector, to obtain a target feature map comprises:

encoding the original image, to obtain a first feature map of the original image;

fusing the prior knowledge vector and the first feature map, to obtain a second feature map; and decoding the second feature map, to obtain the target feature map.

\* \* \* \* \*